United States Patent
Terry et al.

(10) Patent No.: US 11,663,409 B2
(45) Date of Patent: May 30, 2023

(54) SYSTEMS AND METHODS FOR TRAINING MACHINE LEARNING MODELS USING ACTIVE LEARNING

(71) Applicant: Conversica, Inc., Foster City, CA (US)

(72) Inventors: George Alexis Terry, Woodside, CA (US); Werner Koepf, Seattle, WA (US); Siddhartha Reddy Jonnalagadda, Bothell, WA (US); James D. Harriger, Duvall, WA (US); William Dominic Webb-Purkis, San Francisco, CA (US); Keith Godfrey, Seattle, WA (US); Colin C. Ferguson, Bellingham, WA (US); Christopher Allan Long, Seattle, WA (US); Brian Matthew Kaminski, Mill Valley, CA (US); John Sansone, Foster City, CA (US); Jennifer Kirkland, Foster City, CA (US)

(73) Assignee: CONVERSICA, INC., Foster City, CA (US)

( * ) Notice: Subject to any disclaimer, the term of this patent is extended or adjusted under 35 U.S.C. 154(b) by 965 days.

(21) Appl. No.: 16/208,484

(22) Filed: Dec. 3, 2018

(65) Prior Publication Data
US 2019/0180195 A1    Jun. 13, 2019

Related U.S. Application Data

(63) Continuation-in-part of application No. 16/019,382, filed on Jun. 26, 2018, now Pat. No. 11,301,632, (Continued)

(51) Int. Cl.
*G06N 20/00* (2019.01)
*G06F 16/34* (2019.01)
(Continued)

(52) U.S. Cl.
CPC ............. *G06N 20/00* (2019.01); *G06F 16/34* (2019.01); *G06F 16/35* (2019.01); *G06F 18/217* (2023.01);
(Continued)

(58) Field of Classification Search
None
See application file for complete search history.

(56) References Cited

U.S. PATENT DOCUMENTS

| 7,076,430 B1 | 7/2006 | Cosatto et al. |
| 7,275,083 B1 | 9/2007 | Seibel et al. |

(Continued)

FOREIGN PATENT DOCUMENTS

EP    3467755    4/2019

OTHER PUBLICATIONS

USPTO, ISA/US, "Notification of Transmittal of the ISR and the WO of the International Searching Authority or the Declaration", in PCT Application No. PCT/US2016/014650, dated May 6, 2016, 12 pages.

(Continued)

*Primary Examiner* — David R Vincent
(74) *Attorney, Agent, or Firm* — Kang S. Lim

(57) ABSTRACT

Systems and methods for improvements in AI model learning and updating are provided. The model updating may reuse existing business conversations as the training data set. Features within the dataset may be defined and extracted. Models may be selected and parameters for the models defined. Within a distributed computing setting the parameters may be optimized, and the models deployed. The training data may be augmented over time to improve the models. Deep learning models may be employed to improve system accuracy, as can active learning techniques. The models developed and updated may be employed by a (Continued)

response system generally, or may function to enable specific types of AI systems. One such a system may be an AI assistant that is designed to take use cases and objectives, and execute tasks until the objectives are met. Another system capable of leveraging the models includes an automated question answering system utilizing approved answers. Yet another system for utilizing these various classification models is an intent based classification system for action determination. Lastly, it should be noted that any of the above systems may be further enhanced by enabling multiple language analysis.

11 Claims, 44 Drawing Sheets

Related U.S. Application Data which is a continuation-in-part of application No. 14/604,594, filed on Jan. 23, 2015, now Pat. No. 10,803,479, and a continuation-in-part of application No. 14/604,602, filed on Jan. 23, 2015, now Pat. No. 11,042,910, and a continuation-in-part of application No. 14/604,610, filed on Jan. 23, 2015, now Pat. No. 10,026,037.

(51) Int. Cl.
　　*G06F 16/35*　　　(2019.01)
　　*G06F 40/169*　　(2020.01)
　　*G06F 40/284*　　(2020.01)
　　*G06F 40/295*　　(2020.01)
　　*G06F 18/21*　　　(2023.01)

(52) U.S. Cl.
　　CPC .......... *G06F 40/169* (2020.01); *G06F 40/284* (2020.01); *G06F 40/295* (2020.01)

(56) References Cited

U.S. PATENT DOCUMENTS

| | | | |
|---|---|---|---|
| 7,512,580 | B2 | 3/2009 | Ronnewinkel |
| 8,000,973 | B2 | 8/2011 | Williams et al. |
| 8,099,316 | B2 | 1/2012 | Moukas et al. |
| 8,346,563 | B1 | 1/2013 | Hjelm et al. |
| 8,364,467 | B1 | 1/2013 | Bowman et al. |
| 8,666,742 | B2 | 3/2014 | Detlef et al. |
| 8,694,355 | B2 | 4/2014 | Bui et al. |
| 8,700,543 | B2 | 4/2014 | Glickman |
| 8,738,739 | B2 | 5/2014 | Makar |
| 8,767,948 | B1 | 7/2014 | Riahi |
| 8,787,553 | B2 | 7/2014 | Fan et al. |
| 9,258,423 | B1 | 2/2016 | Beall |
| 9,367,814 | B1 | 6/2016 | Lewis et al. |
| 9,552,591 | B2 | 1/2017 | Barak et al. |
| 9,805,018 | B1 | 10/2017 | Richfield |
| 10,043,205 | B2 | 8/2018 | Gupta et al. |
| 2005/0080613 | A1 | 4/2005 | Colledge et al. |
| 2006/0074634 | A1* | 4/2006 | Gao ............... G06F 40/211 704/9 |
| 2007/0036334 | A1 | 2/2007 | Culbertson et al. |
| 2007/0129993 | A1 | 6/2007 | Alvin |
| 2007/0233692 | A1 | 10/2007 | Lisa et al. |
| 2008/0071606 | A1 | 3/2008 | Whiteley et al. |
| 2009/0048859 | A1 | 2/2009 | McCarthy et al. |
| 2009/0228264 | A1 | 9/2009 | Williams et al. |
| 2010/0010885 | A1 | 1/2010 | Hill et al. |
| 2011/0060643 | A1 | 3/2011 | Davis et al. |
| 2012/0191546 | A1 | 7/2012 | Phelan |
| 2012/0233534 | A1* | 9/2012 | Vanderwende ....... G06F 40/279 715/230 |
| 2012/0245925 | A1 | 9/2012 | Guha |
| 2013/0046531 | A1 | 2/2013 | Chandramouli |
| 2013/0086188 | A1 | 4/2013 | Mays et al. |
| 2013/0297442 | A1 | 11/2013 | Simons et al. |
| 2013/0346067 | A1 | 12/2013 | Bhatt |
| 2014/0122407 | A1 | 5/2014 | Duan |
| 2014/0149161 | A1 | 5/2014 | Hedges |
| 2014/0195354 | A1 | 7/2014 | Pokonosky |
| 2014/0222854 | A1 | 8/2014 | Lee et al. |
| 2014/0278958 | A1 | 9/2014 | Nukala et al. |
| 2014/0279050 | A1 | 9/2014 | Makar et al. |
| 2014/0280184 | A1 | 9/2014 | Swaminathan et al. |
| 2014/0280225 | A1 | 9/2014 | Southern-Boukerrou |
| 2014/0280623 | A1 | 9/2014 | Duan |
| 2014/0288920 | A1 | 9/2014 | Proux |
| 2015/0019305 | A1 | 1/2015 | Gorawala |
| 2015/0100364 | A1 | 4/2015 | Friedman et al. |
| 2015/0348548 | A1 | 12/2015 | Piernot |
| 2015/0350144 | A1 | 12/2015 | Zeng et al. |
| 2015/0365527 | A1 | 12/2015 | Chakravarthy |
| 2016/0071117 | A1 | 3/2016 | Duncan |
| 2016/0125364 | A1 | 5/2016 | Field et al. |
| 2016/0217500 | A1 | 7/2016 | Brigham et al. |
| 2016/0232457 | A1 | 8/2016 | Gray et al. |
| 2017/0091320 | A1 | 3/2017 | Posta et al. |
| 2017/0323065 | A1 | 11/2017 | Proctor Beauchamp et al. |

OTHER PUBLICATIONS

USPTO, ISA/US, "Notification of Transmittal of the ISR and the WO of the International Searching Authority or the Declaration", in PCT Application No. PCT/US2018/051827, dated Feb. 5, 2019, 10 pages.

USPTO, ISA/US, "Notification of Transmittal of the ISR and the WO of the International Searching Authority or the Declaration", in PCT Application No. PCT/US2018/063928, dated May 10, 2019, 13 pages.

Quote Wizard & AVA.AI Unveil Automated Virtual Assistant for Insurance Agents Jun. 20, 2014. Insurance Weekly News (Year: 2014).

Artificial Intelligence-Based Email Conversations Shown to Quadruple Lead Engagement for more Effective Sales and Marketing Campigns Jun. 5, 2014, NASDAQ OMX' s News Release Distribution Channel (Year: 2014).

Artificial Intelligence Comes to Your Email; Artificial Life Releases New Intelligent Email Module, Mar. 27, 2002, Business Wire (Year: 2002).

\* cited by examiner

Fig. 23

| Conversation | Production Accuracy | Agreement Accuracy | Deep Learning Accuracy |
|---|---|---|---|
| A | 2nd% | 3rd% | 1st% |
| B | 2nd% | 3rd% | 1st% |
| C | 1st% | 3rd% | 2nd% |
| D | 3rd% | 1st% | 2nd% |
| E | 2nd% | 1st% | 3rd% |
| F | 1st% | 3rd% | 2nd% |
| G | 3rd% | 2nd% | 1st% |
| H | 1st% | 3rd% | 2nd% |
| I | 3rd% | 2nd% | 1st% |
| J | 3rd% | 1st% | 2nd% |
| K | 3rd% | 1st% | 2nd% |

Fig. 24B

| Use Cases | Inbound Leads | Use Case 2 | Use Case 3 | Use Case 4 | Use Case 5 | Use Case 6 |
|---|---|---|---|---|---|---|
| Definition | Follow-up with Inbound Leads that have recently actively requested information. | Definition 2 | Definition 3 | Definition 4 | Definition 5 | Definition 6 |
| Goal/Objective | Set an appointment with Sales | Objective 2 | Objective 3 | Objective 4 | Objective 5 | Objective 6 |
| Drive Revenue or Offset Cost | Drive Revenue | Driver 2 | Driver 3 | Driver 4 | Driver 5 | Driver 6 |
| ROI/Impact | # Appointments Set # of Opportunities | Impact 2 | Impact 3 | Impact 4 | Impact 5 | Impact 6 |

| Use Cases | Upsell/Expand Usage | Use Case 2 | Use Case 3 | Use Case 4 | Use Case 5 | Use Case 6 |
|---|---|---|---|---|---|---|
| Definition | Engage with existing customers regarding new features and expansion opportunities. | Definition 2 | Definition 3 | Definition 4 | Definition 5 | Definition 6 |
| Goal/Objective | Schedule call with CSM and/or adopt paid or free feature | Objective 2 | Objective 3 | Objective 4 | Objective 5 | Objective 6 |
| Drive Revenue or Offset Cost | Drive Revenue and Offset Cost | Driver 2 | Driver 3 | Driver 4 | Driver 5 | Driver 6 |
| ROI/Impact | # Appointments Set and Feature Adoption | Impact 2 | Impact 3 | Impact 4 | Impact 5 | Impact 6 |

| Use Cases | Collections | Use Case 2 | Use Case 3 |
|---|---|---|---|
| Definition | Contacts clients with past due accounts that have not responded to other collection attempts | Definition 2 | Definition 3 |
| Goal/Objective | Schedule call with AR to process payment | Objective 2 | Objective 3 |
| Drive Revenue or Offset Cost | Offset Cost | Driver 2 | Driver 3 |
| ROI/Impact | # Appointments Set and Payments Received | Impact 2 | Impact 3 |

2800E

| Candidate Sourcing | Use Case 2 | Use Case 3 |
|---|---|---|
| Reaches out to potential candidates with backgrounds that would be a good fit for a role. | Definition 2 | Definition 3 |
| Schedule call with hiring manager/recruiter | Objective 2 | Objective 3 |
| Offset Cost | Driver 2 | Driver 3 |
| # Appointments Set | Impact 2 | Impact 3 |

SYSTEMS AND METHODS FOR TRAINING MACHINE LEARNING MODELS USING ACTIVE LEARNING

CROSS REFERENCE TO RELATED APPLICATIONS

This continuation-in-part application is a non-provisional and claims the benefit of U.S. provisional application entitled "Systems and Methods for Improved Machine Learning for Conversations," U.S. provisional application No. 62/594,415, filed in the USPTO on Dec. 4, 2017.

This continuation-in-part application also claims the benefit of U.S. application entitled "Systems and Methods for Natural Language Processing and Classification," U.S. application Ser. No. 16/019,382, filed in the USPTO on Jun. 26, 2018, pending, which is a continuation-in-part application which claims the benefit of U.S. application entitled "Systems and Methods for Configuring Knowledge Sets and AI Algorithms for Automated Message Exchanges," U.S. application Ser. No. 14/604,610, filed in the USPTO on Jan. 23, 2015, now U.S. Pat. No. 10,026,037 issued Jul. 17, 2018. Additionally, U.S. application Ser. No. 16/019,382 claims the benefit of U.S. application entitled "Systems and Methods for Processing Message Exchanges Using Artificial Intelligence," U.S. application Ser. No. 14/604,602, filed in the USPTO on Jan. 23, 2015, pending and U.S. application entitled "Systems and Methods for Management of Automated Dynamic Messaging," U.S. application Ser. No. 14/604,594, filed in the USPTO on Jan. 23, 2015.

This application is also related to co-pending and concurrently filed in the USPTO on Dec. 3, 2018, U.S. application Ser. No. 16/208,478, entitled "Systems and Methods for Generating and Updating Machine Hybrid Deep Learning Models", and U.S. application Ser. No. 16/208,408, entitled "Systems and Methods for Multi Language Automated Action Response".

All of the above-referenced applications/patents are incorporated herein in their entirety by this reference.

BACKGROUND

The present invention relates to systems and methods for innovative advances and applications in the generation and automatic models using statistical techniques including but not limited to machine learning, active learning, reinforcement learning, transfer learning, and deep learning. The said models are applied for a variety of applications in conversational artificial intelligence (AI) including but not limited to message response generation, AI assistant performance, and other language processing, primarily in the context of the generation and management of a dynamic conversations. Such systems and methods provide a wide range of business people more efficient tools for outreach, knowledge delivery, automated task completion, and also improve computer functioning as it relates to processing documents for meaning. In turn, such system and methods enable more productive business conversations and other activities with a majority of tasks performed previously by human workers delegated to artificial intelligence assistants.

Artificial Intelligence (AI) is becoming ubiquitous across many technology platforms. AI enables enhanced productivity and enhanced functionality through "smarter" tools. Examples of AI tools include stock managers, chatbots, and voice activated search-based assistants such as Siri and Alexa.

Ultimately, the utility of any given AI system is rooted in the models the systems employs when making response actions. Some of the most basic AI systems rely upon rule based systems, state machines, basic decision trees, and traditional machine learning algorithms all of which are tuned manually each time a model is built. While well suited for certain basic tasks, these systems are not scalable to creating assistants with general intelligence and not suitable for more complex activities where inputs are not clearly defined or are subject to a great degree of variability.

For example, for chatbots, or any AI system that converses with a human, the input message can vary almost indefinitely. Even for a particular question or point, the ways this may be stated are many. For systems that need to interpret human dialog, and respond accordingly, simple rule based systems are typically inadequate. More complicated machine learning systems that generate complex models may allow for more accurate AI operation.

Machine learning based systems take in large training sets of data and generate models that respond to new data sets. Generally, the larger and more accurate a training set, the more accurate the resulting model is. However, even the most advanced machine learning models may be lacking for truly complicated tasks such as open ended conversation or for complex personal assistants.

It is therefore apparent that an urgent need exists for advancements in the generation, learning and updating of AI models to allow for improved conversation systems and for added functionalities, such as objective driven AI assistant systems.

SUMMARY

To achieve the foregoing and in accordance with the present invention, systems and methods for improvements in AI model learning and updating are provided.

In some embodiments, the model updating may reuse existing business conversations as the training data set. Features within the dataset may be defined and extracted. Models may be selected and parameters for the models defined. Within a distributed computing setting the parameters may be optimized, and the models deployed. The training data may be augmented over time to improve the models. Visualization metrics for the models may also be generated and displayed. These visualization metrics may include accuracy, precision, recall, f1-score, and f beta-score. The visualization metrics may include generating a tree visualizer, response browser and an accuracy browser Existing business conversations may be reused by manually identifying actions applicable to the conversations, automatically identifying context of responses in the conversation, generating instance-label pairs for each response, and randomly selecting a preset number of instance-label pairs as the test data set. Likewise, the defining and extracting features may include processing messages in the test data into sentences, parts of speech, normalized tokens, phrase chunks, syntactic dependencies, and constituency trees. Next name entity recognition is performed to extract concepts. The name entities may be normalized, and concept associations may be extracted. A lexicon for the concept associations is generated from which the features are obtained.

Model deployment may leverage a docker which the model is inserted into. A decision tree is generated using the docked model, and the model may be linked to a classifier service. Rules are added to assist the classifier service, and a server/network is then provisioned for the model. As the models are updated and redeployed, the models may be versioned, and each version may be compared against prior versions to confirm improvement in model performance. Additionally, thresholds for model performance may be set allowing for fallback to hardrule systems or human intervention when required.

In some embodiments, deep learning models may be employed to improve system accuracy. These deep learning models may be generated by collecting a corpus of human-to-human conversations, processing the conversations to remove boilerplate language, replacing entities in the processed conversations, converting the entity replaced conversations format to context, utterance and label, embedding the converted conversations, and convoluting the embedded conversations a number of times. The convoluting includes multiple sets of learnable filters with small receptive fields. The output of the convolution layers may be flattened, and rectifying linear units may be generated and max pooled. This results in a deep learning output that may then be combined with more traditional machine learning models to generate a hybrid model.

This deep learning methodology may employ convolutional neural networks, and in particular character level convolutional neural networks. Word2Vec and Glove and/or InferSent embedding may be leveraged with the convolutional neural networks. In some cases, the deep learning output is generated using bidirectional long short term memory (LSTM) encoders.

In addition to using deep learning techniques, active learning techniques may be employed for the generation of some models. Active learning may include uploading a preset number of sentences, suggesting high priority annotations in the uploaded sentences, generating multiple annotations per action, intent, or entity found in the uploaded sentences, selecting from the multiple annotations a subset of reliable annotations, where the subset is selected based upon low inter-annotator agreement, and building a machine learning model using the subset of reliable annotations. In some cases, the f-score for the model is calculated and compared to an acceptable level, which may be 95% in some cases. If below this threshold the system may repeat the process of training to improve the model performance.

The models developed and updated may be employed by a response system generally, or may function to enable specific types of AI systems. One such a system may be an AI assistant that is designed to take use cases and objectives, and execute tasks until the objectives are met. These AI systems are thus "rewards based" and may have access to a suite of external third party systems (such as calendar systems, frequently asked questions with approved answers, contact and CRM systems, etc.) as well as persisting memories of actions taken with various targets/leads in order to accomplish their objectives. In some embodiments, the objectives are initially selected for the AI assistant (often relating to a use case) and subsequently the resources, including access to third party systems, is determined based upon the objectives needing to be met. The AI assistant engages in multiple rounds of conversations with the given target/lead using any of the previously discussed modeling methods to classify the conversations and take appropriate actions. These iterative conversations may continue until the particular objectives are met.

In some embodiments, the AI assistant may include a marketing assistant, a customer service assistant, a customer success assistant, a recruiting assistant, a legal assistant, a finance assistant, a human resources assistant, a sales assistant, a social media assistant, and a focus group assistant.

By way of example, for a marketing assistant the use cases may include handling inbound leads, handling aged leads, pre-event management, post-event management, outreach, and alternate contact; and the objectives for this assistant may include setting up appointments with a sales representative, beginning a nurturing conversation, and collecting new leads. Also for example, the use cases for a customer success assistant include expanding usage, renewal of a deal, winning back lost customers, advocate management, health checks, and events; while the objectives may include scheduling a call with a customer success manager, adoption of a feature, contract renewal, gathering feedback from customers, driving positive reviews, gathering feedback for product improvement, increasing customer usage, and driving event attendance. For the finance assistant use cases may include collections, payment reminders and updating billing information, and objectives may include scheduling a call with accounts receivable, collecting payment prior to collections, and updating payment information. For a recruiting assistant use cases may include candidate sourcing, applicant follow-up, and applicant pool interest, while objectives may include scheduling a call with a hiring manager or recruiter, generating summaries of candidates resume and virtual screen, salary negotiation, and support candidate with hiring paperwork. For a human resources assistant use cases may include onboarding, orientation, employee support and employee satisfaction, and objectives may include providing documentation to employees responsive to needs, providing access to frequently asked questions with approved answers, satisfaction surveying, support candidate with hiring paperwork, benefits enrollment, and training. For a legal assistant the use cases may include advice and investor relationships, and objectives include providing access to frequently asked questions with approved answers related to legal matters, collecting investor feedback, and scheduling meetings with corporate counsel.

Another system capable of leveraging the models includes an automated question answering system utilizing approved answers. Such a system receives a response message from a human contact, identifies questions within the received response message using machine learning classifiers, cross references the identified questions with approved answer database, and outputs an approved answer from the approved answer database when there is a match. If no match is found a canned answer may be sent out instead. The outputs may be sent to a chatbot for display back to the user. Identifying the question may include identifying if a question is present and classifying the topic of the question. The topic of the question is then used for the cross reference against answers by topic. The answer topics and approved answers are provided by a third party company.

Yet another system for utilizing these various classification models is an intent based classification system for action determination. Such a system allows mapping intents to actions using rules. Outputs of such a mapping are then received as examples in the form of text and an appropriate action in response to such a text. These outputs are used to generate a machine learning intent model. A response is then received, and the intent of the response is determined using the intent model. Deep learning models may be employed to extract entity information from the response as well. The intent and entity information is then used by an action model to determine the appropriate action to be taken for the response. The action model may be developed, in some cases, using active learning techniques described above.

In some embodiments, it is possible that message routing may become necessary. This occurs where a specialized AI assistant that has a relationship with an individual, and the AI assistant is queried by the individual on a topic outside the expertise of the given system. The AI assistant is capable of recognizing that the message classification is not a topic for which it is designed to answer, and may cross reference a generic classification for the message against a repository of contacts that are better suited to address the topic at hand. Once a more suitable contact is identified, the system may automatically route the message to the appropriate contact and/or provide the contact information to the individual.

Lastly, it should be noted that any of the above systems may be further enhanced by enabling multiple language analysis. Rather than perform classifications using full training sets for each language, as is the traditional mechanism, the present systems leverage dictionaries for all supported languages, and translations to reduce the needed level of training sets. In such systems, a primary language is selected and a full training set is used to build a model for the classification using this language. Smaller training sets for the additional languages may be added into the machine learned model. These smaller sets may be less than half the size of a full training set, or even an order of magnitude smaller. When a response is received, it may be translated into all the supported languages, and this concatenation of the response may be processed for classification. Additionally, such systems may be capable of altering the language in which new messages are generated. For example, if the system detects that a response is in French, the classification of the response may be performed in the above mentioned manner, and similarly any additional messaging with this contact may be performed in French.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 23 is an example illustration of an action accuracy visualization, in accordance with some embodiment;

FIG. 24B is a chart of model accuracies, in accordance with some embodiment;

FIG. 28C is an illustration of example specifications for a marketing assistant, in accordance with some embodiment;

FIG. 28D is an illustration of example specifications for a customer success assistant, in accordance with some embodiment;

FIG. 28E is an illustration of example specifications for a finance assistant, in accordance with some embodiment;

DETAILED DESCRIPTION

Figure 1:
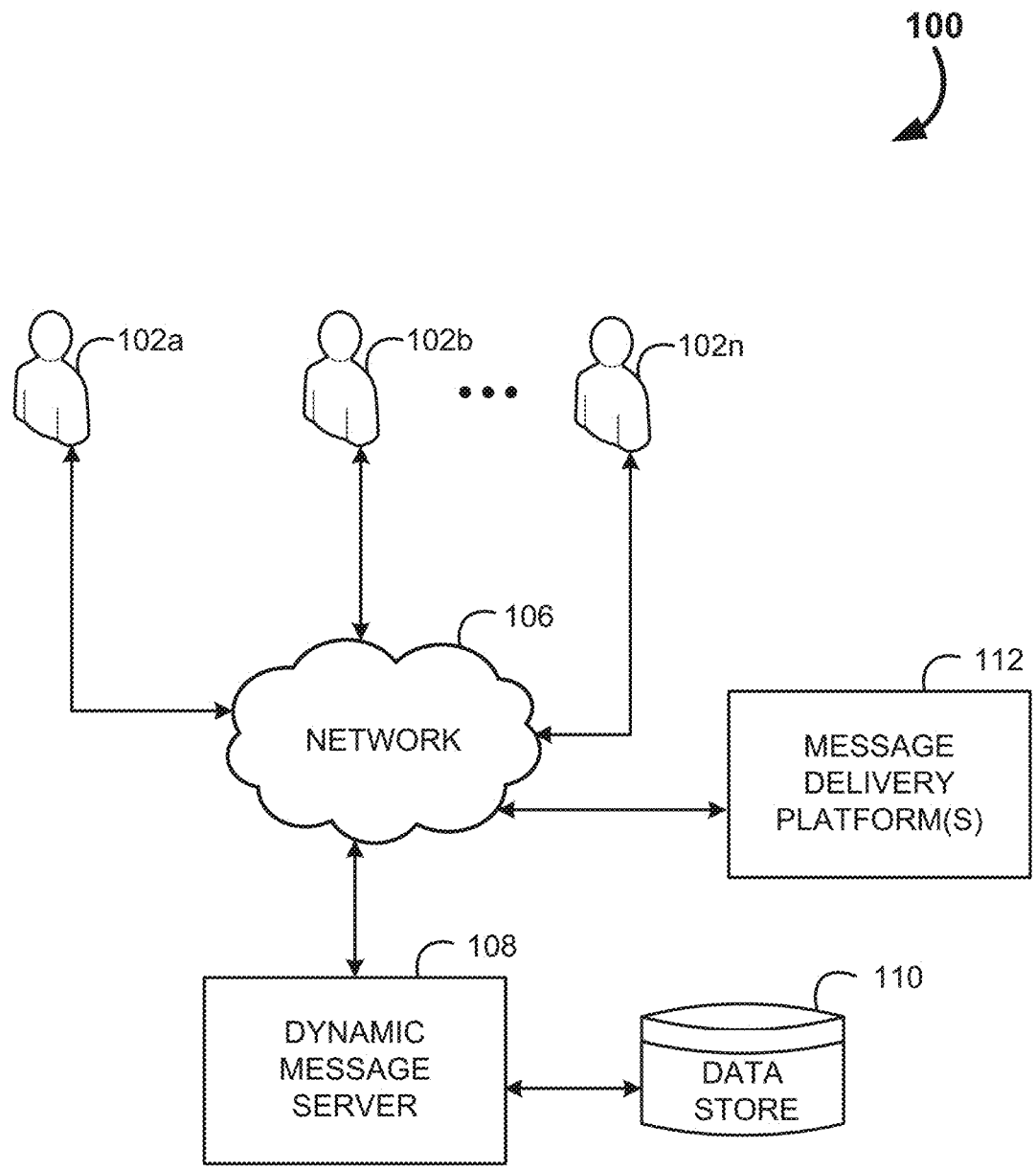
FIG. 1 is an example logical diagram of a system for generation and implementation of messaging conversations, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to cooperation between business actors such as human operators and AI systems. While such systems and methods may be utilized with any AI system, such cooperation systems particularly excel in AI systems relating to the generation of automated messaging for business conversations such as marketing and other sales functions. While the following disclosure is applicable for other combinations, we will focus upon mechanisms of cooperation between human operators and AI marketing systems as an example, to demonstrate the context within which the cooperation system excels.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for improvements in AI model generation and utilization within conversation systems and for employment with assistant systems. The goal of the message conversations is to enable a logical dialog exchange with a recipient, where the recipient is not necessarily aware that they are communicating with an automated machine as opposed to a human user. This may be most efficiently performed via a written dialog, such as email, text messaging, chat, etc. However, it is entirely possible that given advancement in audio and video processing, it may be entirely possible to have the dialog include audio or video components as well.

In order to effectuate such an exchange, an AI system is employed within an AI platform within the messaging system to process the responses and generate conclusions regarding the exchange. These conclusions include calculating the context of a document, intents, entities, sentiment and confidence for the conclusions.

I. Dynamic Messaging Systems

To facilitate the discussion, FIG. 1 is an example logical diagram of a system for generating and implementing messaging conversations, shown generally at 100. In this example block diagram, several users 102a-n are illustrated engaging a dynamic messaging system 108 via a network 106. Note that messaging conversations may be uniquely customized by each user 102a-n in some embodiments. In alternate embodiments, users may be part of collaborative sales departments (or other collaborative group) and may all have common access to the messaging conversations. The users 102a-n may access the network from any number of suitable devices, such as laptop and desktop computers, work stations, mobile devices, media centers, etc.

The network 106 most typically includes the internet, but may also include other networks such as a corporate WAN, cellular network, corporate local area network, or combination thereof, for example. The messaging server 108 may distribute the generated messages to the various message delivery platforms 112 for delivery to the individual recipients. The message delivery platforms 112 may include any suitable messaging platform. Much of the present disclosure will focus on email messaging, and in such embodiments the message delivery platforms 112 may include email servers (Gmail, yahoo, Hotmail, etc.). However, it should be realized that the presently disclosed systems for messaging are not necessarily limited to email messaging. Indeed, any messaging type is possible under some embodiments of the present messaging system. Thus, the message delivery platforms 112 could easily include a social network interface, instant messaging system, text messaging (SMS) platforms, or even audio telecommunications systems.

One or more data sources 110 may be available to the messaging server 108 to provide user specific information, message template data, knowledge sets, insights, and lead information. These data sources may be internal sources for the system's utilization, or may include external third-party data sources (such as business information belonging to a customer for whom the conversation is being generated). These information types will be described in greater detail below.

Figure 2:
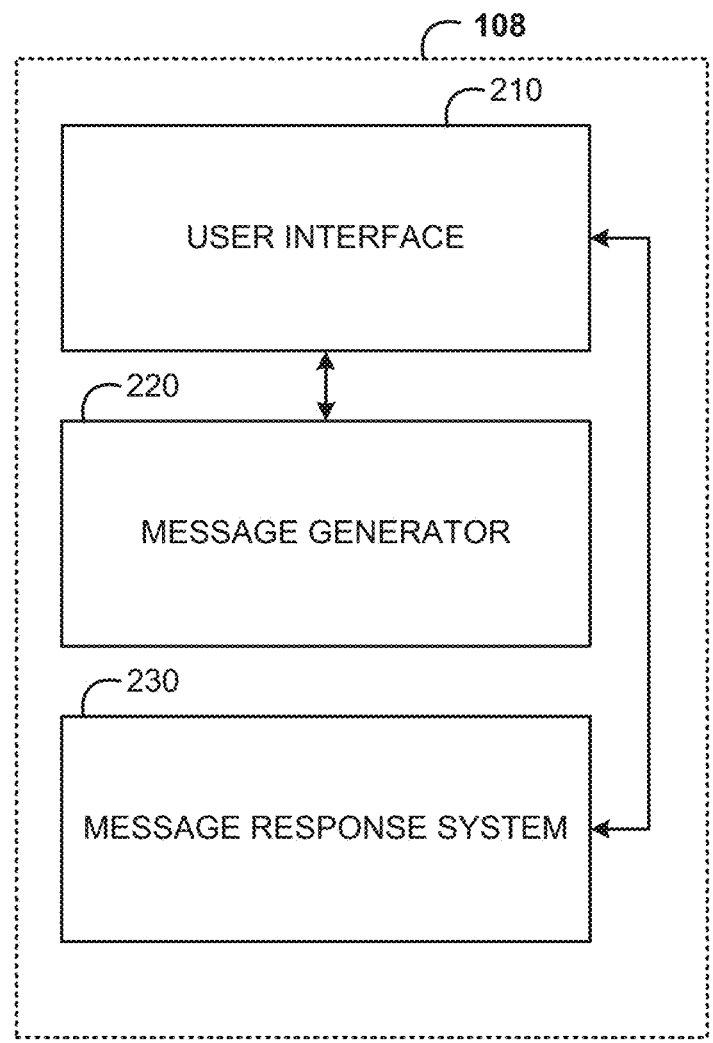
FIG. 2 is an example logical diagram of a dynamic messaging server, in accordance with some embodiment.

Moving on, FIG. 2 provides a more detailed view of the dynamic messaging server 108, in accordance with some embodiment. The server is comprised of three main logical subsystems: a user interface 210, a message generator 220, and a message response system 230. The user interface 210 may be utilized to access the message generator 220 and the message response system 230 to set up messaging conversations, and manage those conversations throughout their life cycle. At a minimum, the user interface 210 includes APIs to allow a user's device to access these subsystems. Alternatively, the user interface 210 may include web accessible messaging creation and management tools, as will be explored below in some of the accompanying example screenshots.

Figure 3:
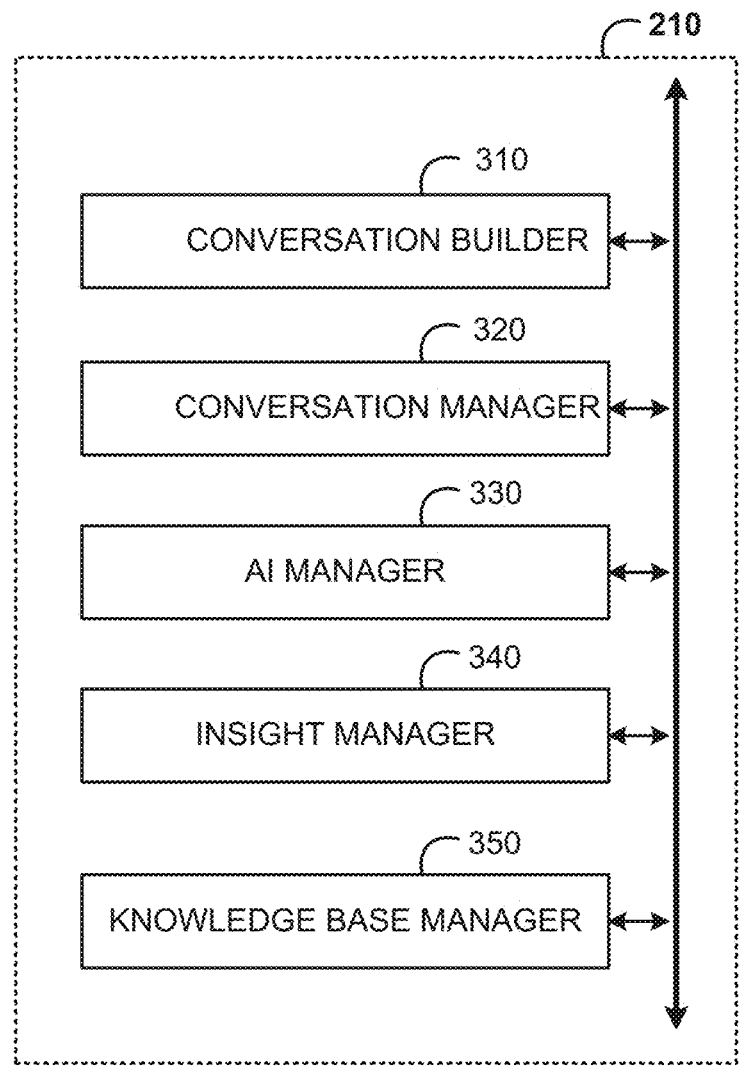
FIG. 3 is an example logical diagram of a user interface within the dynamic messaging server, in accordance with some embodiment.

FIG. 3 provides a more detailed illustration of the user interface 210. The user interface 210 includes a series of modules to enable the previously mentioned functions to be carried out in the message generator 220 and the message response system 230. These modules include a conversation builder 310, a conversation manager 320 an AI manager 330, an insight manager 340, and a knowledge base manager 350.

The conversation builder 310 allows the user to define a conversation, and input message templates for each series within the conversation. A knowledge set and lead data may be associated with the conversation to allow the system to automatically effectuate the conversation once built. Lead data includes all the information collected on the intended recipients, and the knowledge set includes a database from which the AI can infer context and perform classifications on the responses received from the recipients.

The conversation manager 320 provides activity information, status, and logs of the conversation once it has been implemented. This allows the user 102a to keep track of the conversation's progress, success and allows the user to manually intercede if required. The conversation may likewise be edited or otherwise altered using the conversation manager 320.

The AI manager 330 allows the user to access the training of the artificial intelligence which analyzes responses received from a recipient. One purpose of the given systems and methods is to allow very high throughput of message exchanges with the recipient with relatively minimal user input. To perform this correctly, natural language processing by the AI is required, and the AI (or multiple AI models) must be correctly trained to make the appropriate inferences and classifications of the response message. The user may leverage the AI manager 330 to review documents the AI has processed and has made classifications for.

The insight manager 340 allows the user to manage insights. As previously discussed, insights are a collection of categories used to answer some question about a document. For example, a question for the document could include "is the lead looking to purchase a car in the next month?" Answering this question can have direct and significant importance to a car dealership. Certain categories that the AI system generates may be relevant toward the determination of this question. These categories are the 'insight' to the question, and may be edited or newly created via the insight manager 340.

In a similar manner, the knowledge base manager 350 enables the management of knowledge sets by the user. As discussed, a knowledge set is set of tokens with their associated category weights used by an aspect (AI algorithm) during classification. For example, a category may include "continue contact?", and associated knowledge set tokens could include statements such as "stop", "do no contact", "please respond" and the like.

Figure 4:
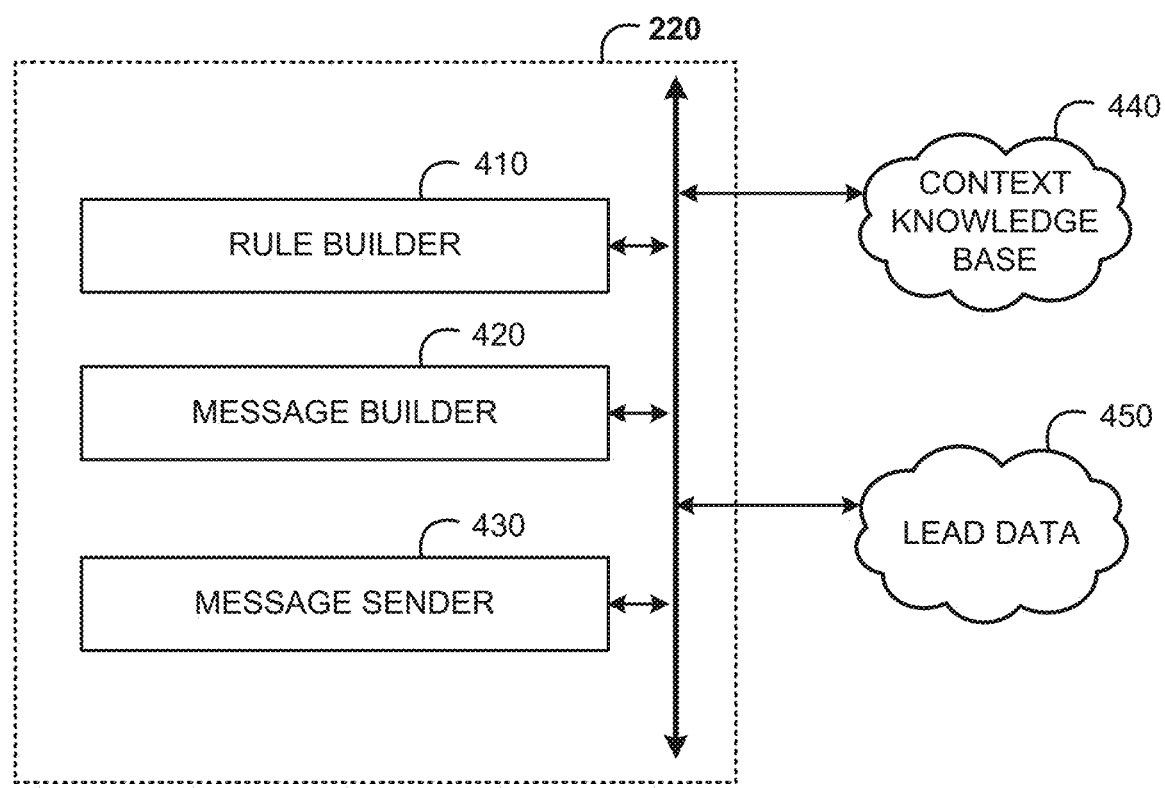
FIG. 4 is an example logical diagram of a message generator within the dynamic messaging server, in accordance with some embodiment.

Moving on to FIG. 4, an example logical diagram of the message generator 220 is provided. The message generator 220 utilizes context knowledge 440 and lead data 450 to generate the initial message. The message generator 220 includes a rule builder 410 which allows the user to define rules for the messages. A rule creation interface which allows users to define a variable to check in a situation and then alter the data in a specific way. For example, when receiving the scores from the AI, if the insight is Interpretation and the chosen category is 'good', then have the Continue Messaging insight return 'continue'.

The rule builder 410 may provide possible phrases for the message based upon available lead data. The message builder 420 incorporates those possible phrases into a message template, where variables are designated, to generate the outgoing message. Multiple selection approaches and algorithms may be used to select specific phrases from a large phrase library of semantically similar phrases for inclusion into the message template. For example, specific phrases may be assigned category rankings related to various dimensions such as "formal vs. informal, education level, friendly tone vs. unfriendly tone, and other dimensions." Additional category rankings for individual phrases may also be dynamically assigned based upon operational feedback in achieving conversational objectives so that more "successful" phrases may be more likely to be included in a particular message template. This is provided to the message sender 430 which formats the outgoing message and provides it to the messaging platforms for delivery to the appropriate recipient.

Figure 5A:
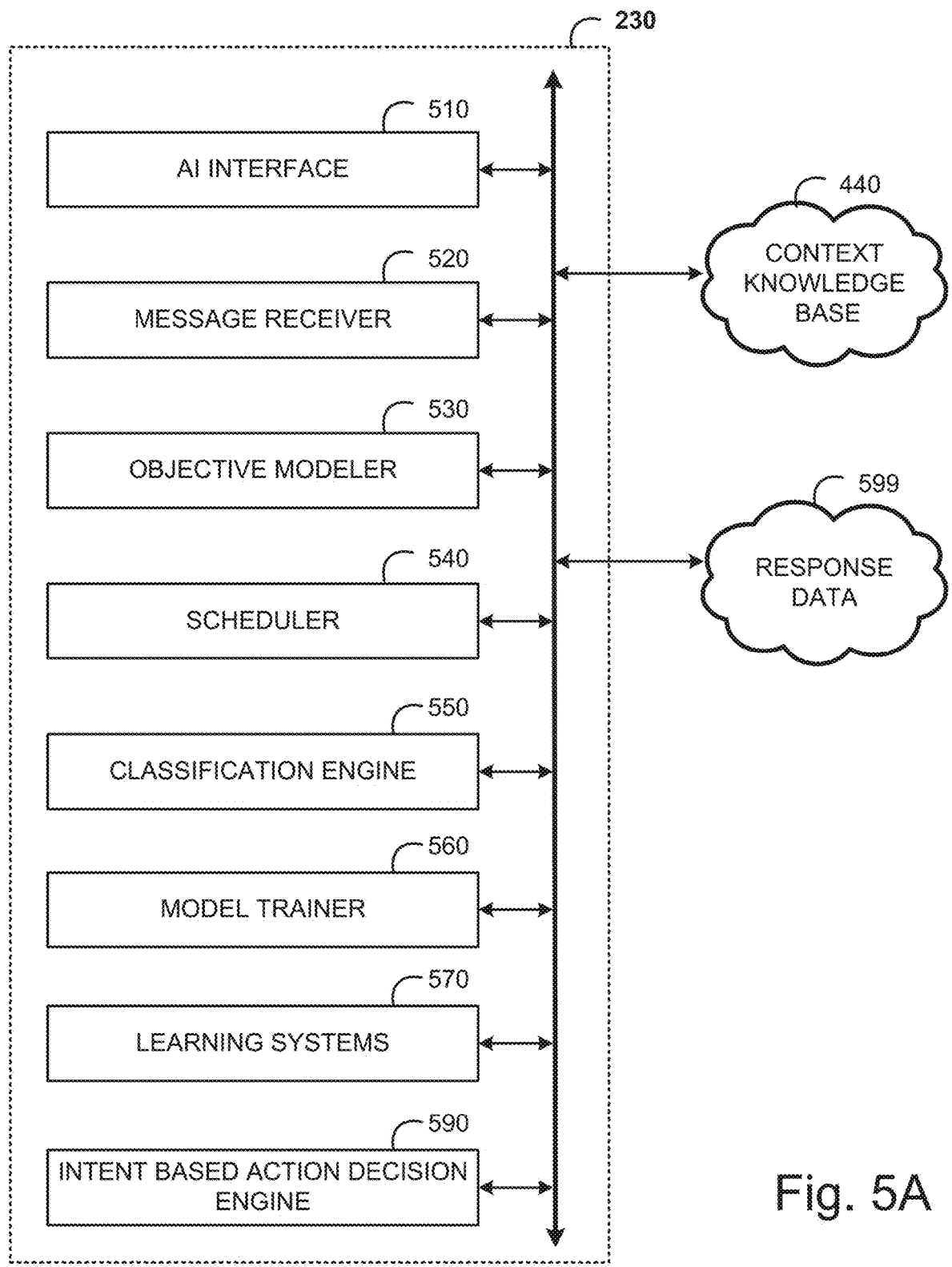
FIG. 5A is an example logical diagram of a message response system within the dynamic messaging server, in accordance with some embodiment.

FIG. 5A is an example logical diagram of the message response system 230. In this example system, the contextual knowledge base 440 is utilized in combination with response data 599 received from the person being messaged. The message receiver 520 receives the response data 599 and provides it to the AI interface 510, objective modeler 530, and classifier engine 550 for feedback. The AI interface 510 allows the AI platform (or multiple AI models) to process the response for context, insights, sentiments and associated confidence scores. The classification engine 550 includes a suite of tools that enable better classification of the messages using models that have been automatically generated and updated by a model trainer 560. Based on the classifications generated by the AI and classification engine 550 tools lead objectives may be updated by the objective modeler 530. The objective modeler may indicate what the objective to the next action in the conversation may entail.

The model trainer 560 is capable of using historical conversation histories to generate and improve classification models, as well as action response models for individual clients. The model trainer utilizes iterative machine learning of training conversations. With each update iteration, accuracy of the models improves, reducing the need for human intervention or fallback to hard rules. The learning systems 570 may be employed to improve model training accuracy and efficiency using deep learning and active learning techniques.

Lastly, an intent based action decision engine 590 may utilize the received models and leverage intent based decision making to improve action accuracy over traditional machine learned or hard rule based decision making processes.

Figure 5B:
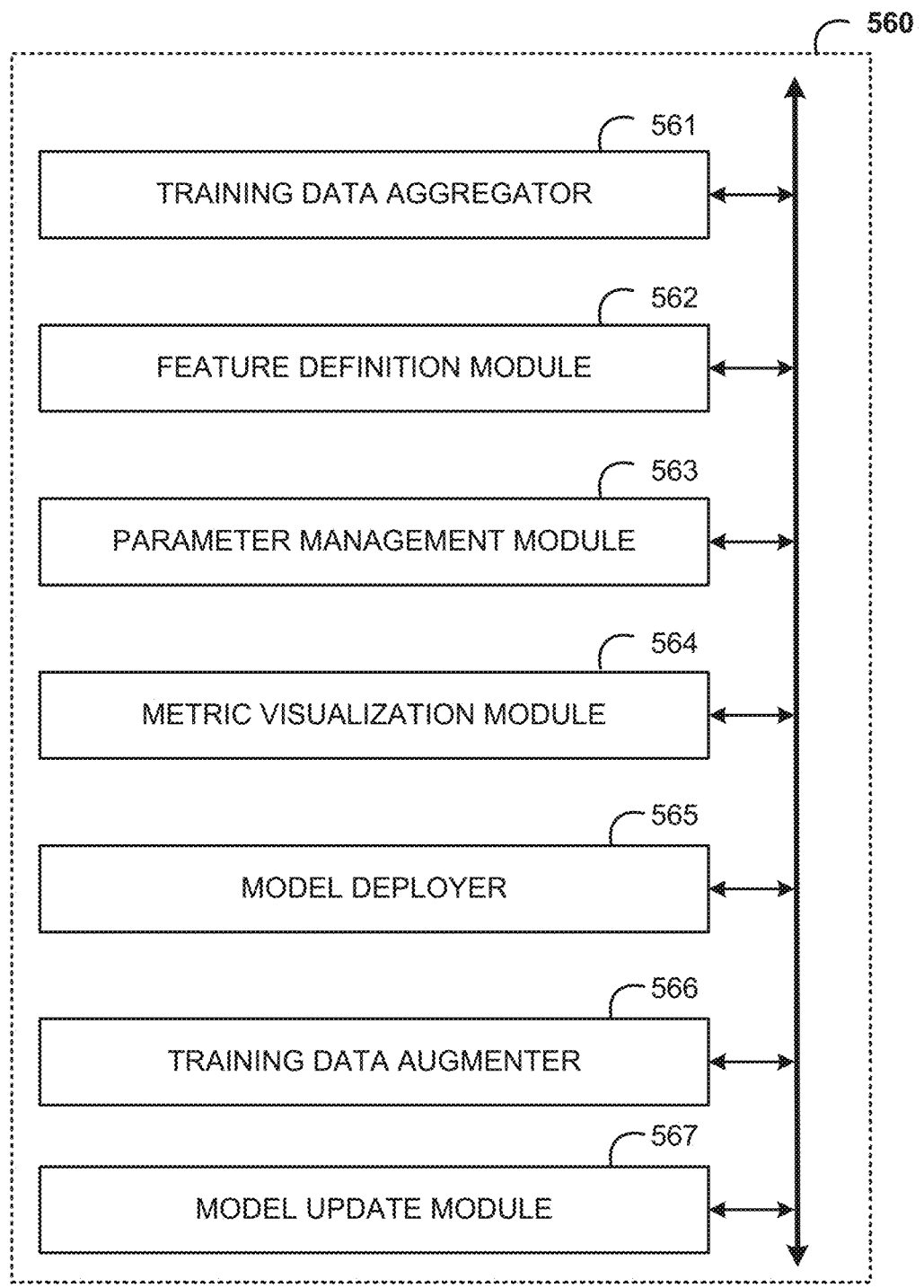
FIG. 5B is an example logical diagram of a model trainer within the message response system, in accordance with some embodiment.

Turning to FIG. 5B, the model trainer 560 is illustrated in greater detail. This component of the message response system may include a training data aggregation interface 561 which collects, or otherwise accesses, historical messaging exchanges. Generally these messaging exchanges (conversations) are between humans, thereby ensuring that the models are being trained to a "gold standard". However, human-AI conversations, if properly vetted to ensure response accuracy, may likewise be employed as part of the training data.

The training data aggregator 561 may further include an interface where a user may manually identify actions that are applicable for a given conversation. For example, within a sales conversation setting, the user may identify within the conversation when various actions, such as continuing messaging, skip to follow-up, do not email, stop messaging and lead to review, for example, are applicable.

After manual tagging of the conversation responses with acceptable actions that could be taken, the data aggregator 561 may automatically segment the message responses by user context, not just of the present response, but also taking into consideration the messaging history across multiple communication channels. For this step, context refers to time, location, language, individuals involved, and similar information. For example, the system may automatically process a response email into various sections, such as the body, subject, sender's first and last name, sender's email, and sent time.

The data aggregator 561 may then generate an instance-label pair for each response. The instance is the various extracted context based upon the response, and the label corresponds to actions that were previously identified by the user. For example, in the sales email exchange discussed above, the instance may be the email response and its individual sections such body and subject and this may be paired with one of the actions previously noted by the user, such as discontinuing messaging.

The data aggregator 561 next randomly selects and removes a portion of the data, and used this extracted portion as a test set. In some embodiments the portion removed may be set to a default of 1000 instance-label pairings. Of course, in alternate embodiments fewer, or more, instance-label pairs may be selected as a test set. Larger sets yield more accuracy at a cost of processing overhead and cost of data extraction, transformation and loading from the human-human conversations.

Once the test sets have been thus defined, the feature definition module 562 may process the body of each response located in the test set into sentences. This sentence processing may leverage regular expressions and machine learning algorithms for sentence boundary detection. Due to the propensity for conversation messaging to be "sloppy" with grammar and proper sentence structure, simple rule-based systems for determining sentence boundaries, such as those employed by a grammar checker, may often be insufficient. As such, machine learning based sentence boundary detection may be employed in some cases with superior results.

The feature definition module 562 also tokens the responses using regular expressions, and tags parts of speech. Part of speech tagging may employ statistical sequential labeling algorithms. The tokens may be normalized using stemming lemmatization, and phrase chunks may be generated. These phrase chunks may include noun phrases, verb phrases, etc. through the usage of shallow parsing. Syntactic dependencies and constituency trees may be built using probabilistic context free grammar and deep learning. Deep learning may leverage character level convolutional neural networks, in some embodiments, and syntax net algorithms in other embodiments. Specific examples of implementation of deep learning will be provided in considerable details below.

The feature definition module 562 may also perform name entity recognition (NER) to extract concepts related to the business being discussed. Examples of this could include a person, for example. Concepts are extracted which are relevant to the actions associated with the response. In some embodiments, concepts in NER are identified using graph based and deep learning statistical sequential labeling algorithms. Examples of which include Conditional Random Fields (CRF) and Bidirectional Long Short Term Memory (LSTM).

The feature definition module 562 also normalizes the named entities to canonical names and identifiers. This normalization may leverage database-based similarity and unsupervised machine learning measures. Associations may also be extracted between the concepts in the conversation using instance-based classification algorithms. For example, a PERSON liking a PRODUCT would be an association that can be determined between these two concepts.

The feature definition module 562 next develops a lexicon related to attributes of concepts and associations. For example, confirmation, declination, negation, opinion/sentiment, and operating verbs may relate to these attributes. Rules may be applied to determine if the lexicon values are present, either fully or partially, in relevant discourse elements in each sentence being analyzed.

Lastly, features, or more formally feature vectors, may be obtained by the feature definition module 562 by combining and permuting the individual outputs of the above steps such as normalized tokens, phrase chunks, syntactical dependencies, normalized NER concepts, associations and the matches with lexicons. In some particular embodiments, the features are transformed including, but are not limited to weighting higher the tokens that appear multiple time in the instance higher, weighting lower the tokens that are not unique as determined by their statistical proportions, stripping or normalizing accents, ignoring the decoding errors using various criteria, converting to lower case, removing words in a lexicon file that are deemed to be unimportant, combining adjacent tokens in the feature vector in groups of two or more, ignoring those tokens that appear in too many instances or appear in too few instances, regularizing the feature vector to penalize for overfitting for using too many features, etc.

The parameter management module 563 defines all algorithms and corresponding parameters that will be tested for action classification along the various features. Algorithms that may be employed by the parameter management module 563 include K-neighbor classifier, support vector machines, Gaussian Process classifier, decision tree classifier, random forest classifier, multi-layer perceptron classifier, Ada Boost Classifier, Gaussian naïve bayes, Quadratic Discriminant Analysis, Linear Discriminant Analysis, stochastic gradient descent classifier, Bagging Classifier, extra trees classifier, gradient boosting classifier and voting classifier. In high-dimensional spaces, data can more easily be separated linearly and the simplicity of classifiers such as naive Bayes and linear support vector machines might lead to better generalization than is achieved by other classifiers. In spaces with fewer dimensions, nearest neighbors, random forest and Gaussian process may be preferred.

The parameter management module 563, after determining parameters, may optimize them in a distributed computing setting. This may include performing an exhaustive search over the specified parameter values for an estimator. Grid search cross validation, or equivalent algorithm, may be employed for this estimator. Grid search cross validation utilizes a "fit" and "score" method, and also implements a "predict", "predict probability", "decision function", "transform" and "inverse transform" if implemented in the estimator. The parameters of the estimator used to apply these methods are optimized by cross-validated grid-search over a parameter grid.

Alternate methods for optimizing the parameters may include using other estimators, such as Randomized Search cross validation or Sequential Nested Search cross validation. Sequential Nested Search cross validation may be implemented locally, and may identify parameters that are independent. These may be sorted by order of importance and grid search or randomized grid search is performed only in individual groups of dependent parameters. This optimization results in minimizing computational time for optimal features, algorithms and their corresponding parameters, in that order. In some embodiments, all component features are extracted using map-reduce framework, the combination set of the component features is optimized, the top performing machine learning algorithms are optimized along with their parameters, and lastly the best ensemble of top-performing machine learning algorithms are optimized.

The metric visualization module 564 generates visualizations such as accuracy, precision, recall, f1-score and f beta-score for the individual classifiers. A tree visualizer illustrates classification trees by volumes, and allows a user to click on a tree to see information about the tree, such as total responses classified by the tree, total confident responses, distribution of the confident classifications, a confusion matrix and pure accuracy. The confusion matrix lists the AI decision along the columns, and human decisions along the rows. Ideally, the matrix should have a high degree of agreement between rows and column, however trends where the AI miss-classifies the message may be determined by patterns in the matrix. An example of a Confusion matrix is provided below:

| [source] classification | [AI] action required | [AI] continue messaging | [AI] stop messaging | [AI] skip to follow-up | [AI] do not email | Total |
|---|---|---|---|---|---|---|
| [human] action required | 12 | 1 | 2 | 1 | 0 | 16 (75% agree) |
| [human] continue messaging | 2 | 12 | 0 | 0 | 0 | 14 (85.7% agree) |
| [human] stop messaging | 2 | 1 | 29 | 0 | 0 | 32 (90.6% agree) |
| [human] skip to followup | 1 | 0 | 0 | 0 | 0 | 1 (none) |
| [human] do not email | 0 | 0 | 1 | 0 | 9 | 10 (90% agree) |
| Total | 17 (70.6% agree) | 14 (85.7% agree) | 32 (90.6% agree) | 1 (none) | 9 (100% agree) | 73 (84.9% agree) |

Metrics may be calculated on a periodic basis, for example weekly, based upon the prior period's validation set. A response browser and action accuracy browser may likewise be generated for display to the user. Examples of the tree visualizer, response browser and action accuracy browser may be seen in relation to FIGS. 21, 22 and 23, respectively.

Figure 21:
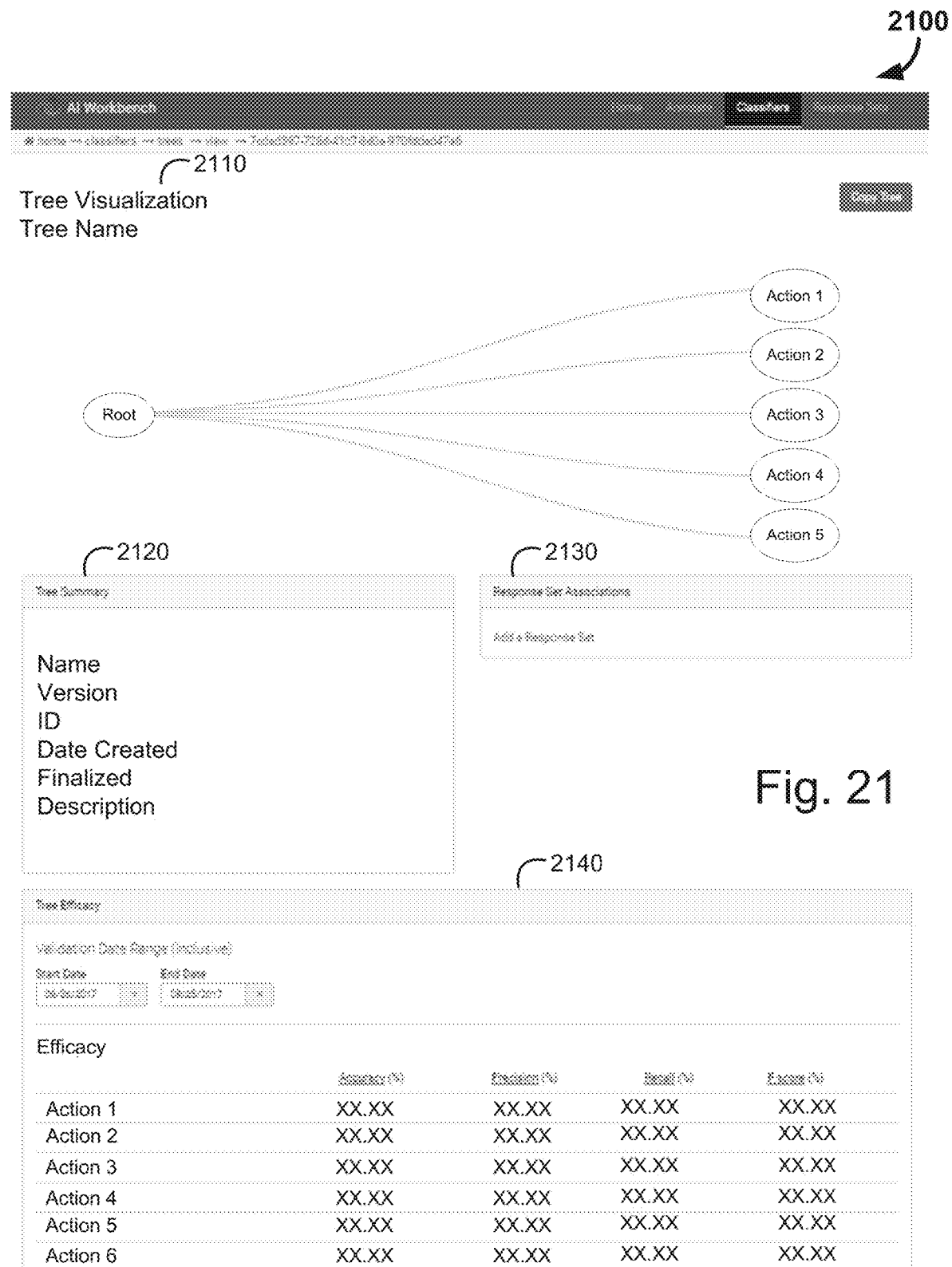
FIG. 21 is an example illustration of a tree visualization, in accordance with some embodiment.

Looking at the example tree visualizer display 2100, at FIG. 21, the tree identifier is seen listed at 2110 with an illustration of the classification tree. A summary for the tree is provided at 2120, along with response set association 2130. The tree efficacy is presented at 2140 for a validation date range.

Figure 22:
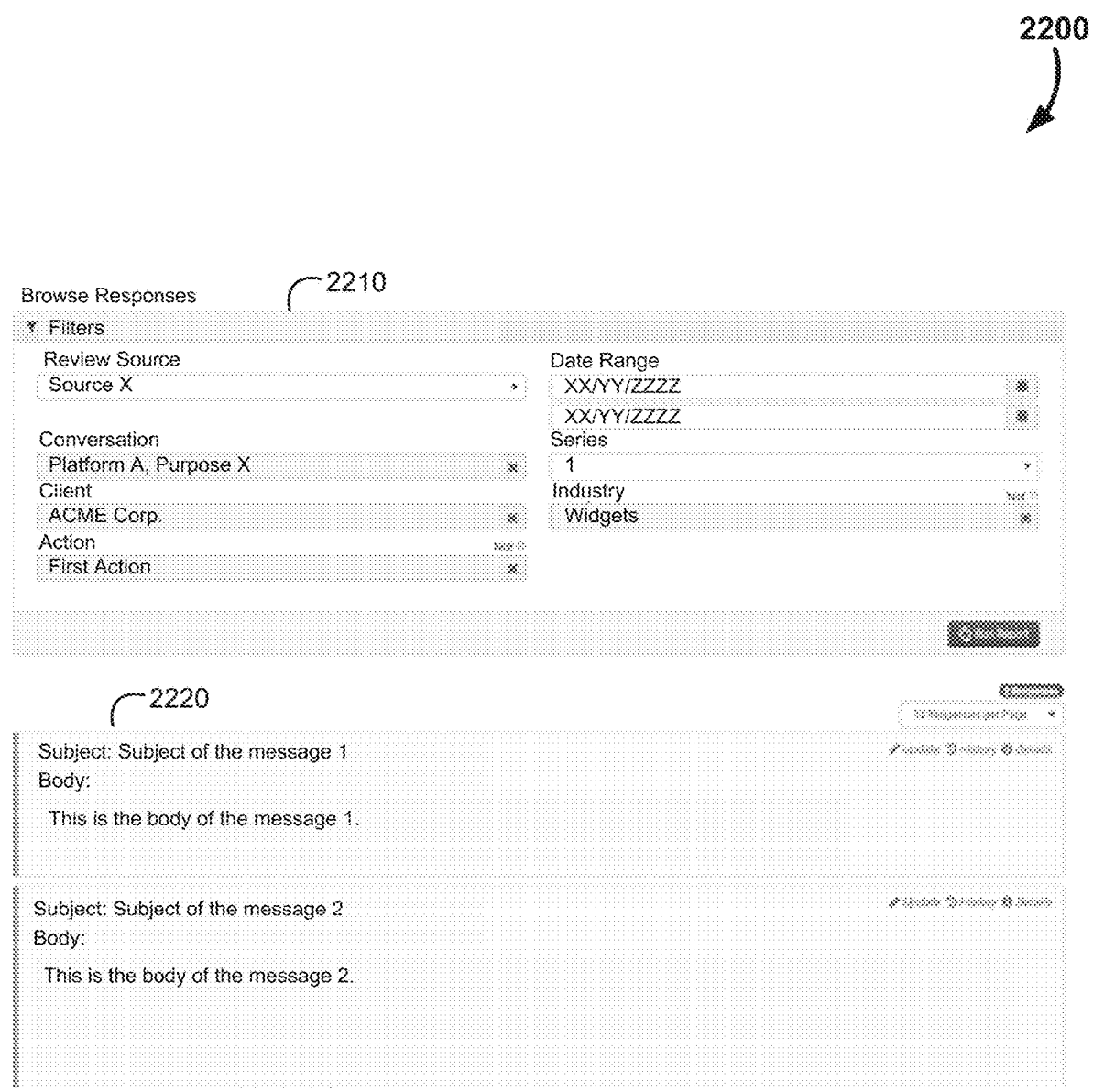
FIG. 22 is an example illustration of a browser response visualization, in accordance with some embodiment.

The browser response display 2200, at FIG. 22, provides the user the ability to filter the responses by a number of features, including message client, conversation type, action taken, date range message series and industry, as seen at 2210. After selecting filters, the report of actions may be run as illustrated at 2220. The applicable responses are then displayed to the user.

Figure 23:
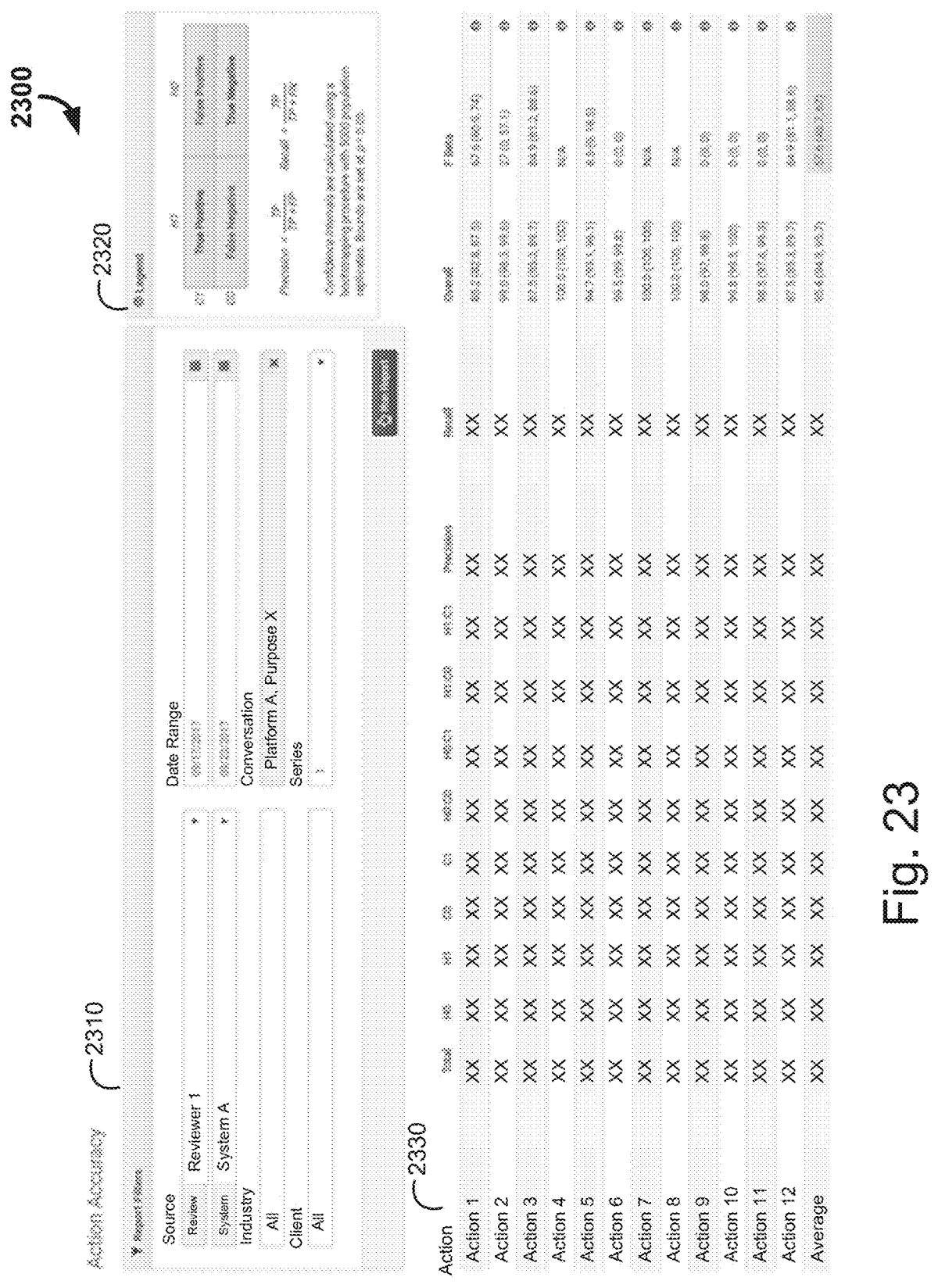

The action accuracy browser display 2300, at FIG. 23, provides the user the ability to filter reports aby reviewer, system, industry, client date ranges, conversation type and message series, as seen at 2310. A legend 2320 provides the user information regarding the report labels. The resulting report 2330 illustrates the actions taken that match the filters selected, including the number of times the action was taken in aggregate, action taken by the human versus and computer, and differences in these actions decisions indicating true positives, false positives, true negatives and false negatives. Precision, recall, a d f-beta scores are also displayed for the actions.

Returning to FIG. 5B, the model deployer 565 embeds the classification model that has been optimized into a docker image. In some embodiments, the docker image includes a REST API that exposes the model's functionality and other diagnostic information (e.g., version number, etc.). From the model a decision tree is generated, which may include thresholds for determining when a classification is determined to be sufficiently confident to move forward. The model is then linked to a classifier service which allows the addition of rules for which responses should be classified by the model. For example, the model may determine that there is interest in a product, but depending upon the rules different action responses may be made. For example, in one system the response may include setting up a meeting with a sales representative, while in another system the pricing information may be conveyed automatically through the same medium messaging has taken place in.

Lastly, servers and network infrastructure is automatically provisioned for the new model. This provisioning may utilize Kubernetes, or similar container orchestration system. The model trainer 560 may also include functionality for hardrule fallback when a confidence threshold is not met by the deployed model.

The training data augmenter 566 operates after model deployment. After new responses are generated from existing and new client sources, the system may annotate all new responses. Any classification that the system is not sufficiently confident in, or classifications that are flagged by an active learning approach (as will be disclosed in greater detail below) are then collected. These collected classifications contribute to an additional instance-label set that is processed much like the initially determined instance-label pairings.

Lastly, a model update module 567 uses these new instance-label pairs to augment the earlier pairs after a feature extraction process as described previously. This causes the training data to be fleshed out with additional data specifically chosen due to its classification difficulty or as suggested by the active learning. A threshold for training set size versioning is selected. In some embodiments, this may be set to 10% increase in training set sizing. After the model is subjected to a training set that meets this threshold, the model may be saved as a separate version, allowing for comparison between versions and, if necessary, reversion to an earlier state if the training data is somehow corrupted.

After each version is generated, the model update module 567 may compare the new model version against the previous model version for key metrics like accuracy, precision, higher recall, lower false positives, and lower false negatives. This comparison may utilize a randomized data set, or may utilize the original training set used for the initial model build for consistency in results. If the updated model is found to be superior to the earlier versions, then the system may build the model binary, embed it in a docker image and verify the docker embedded model matches the most recent versioned model. This verification may be performed by comparing outputs from the docker embedded model against a known set of outputs for a given set of inputs.

While the models described do not need human intervention and the models learn and improve with new data streaming in to the system. In addition, from time to time, the system provides developers the capability to tune the system manually as opposed to treating it like a blackbox. This is done by giving them access to parameter and hyperparameters values across the model building steps and they can adjust them for all labels for accuracy and confidence levels. Separate thresholds may also be determined for the parameter optimizations performed previously. Active learning strategies may be employed to efficiently determine which classifications do not meet the set thresholds, and therefore are best determined by human intervention. These algorithms used to determine which classifications should be handled by human may include uncertainty sampling algorithms, query by committee, expected model change, expected error reduction, variance reduction, balance exploration and exploitation, and exponentiated gradient exploration for active learning. These various methods shall be described in more detail below.

Figure 5C:
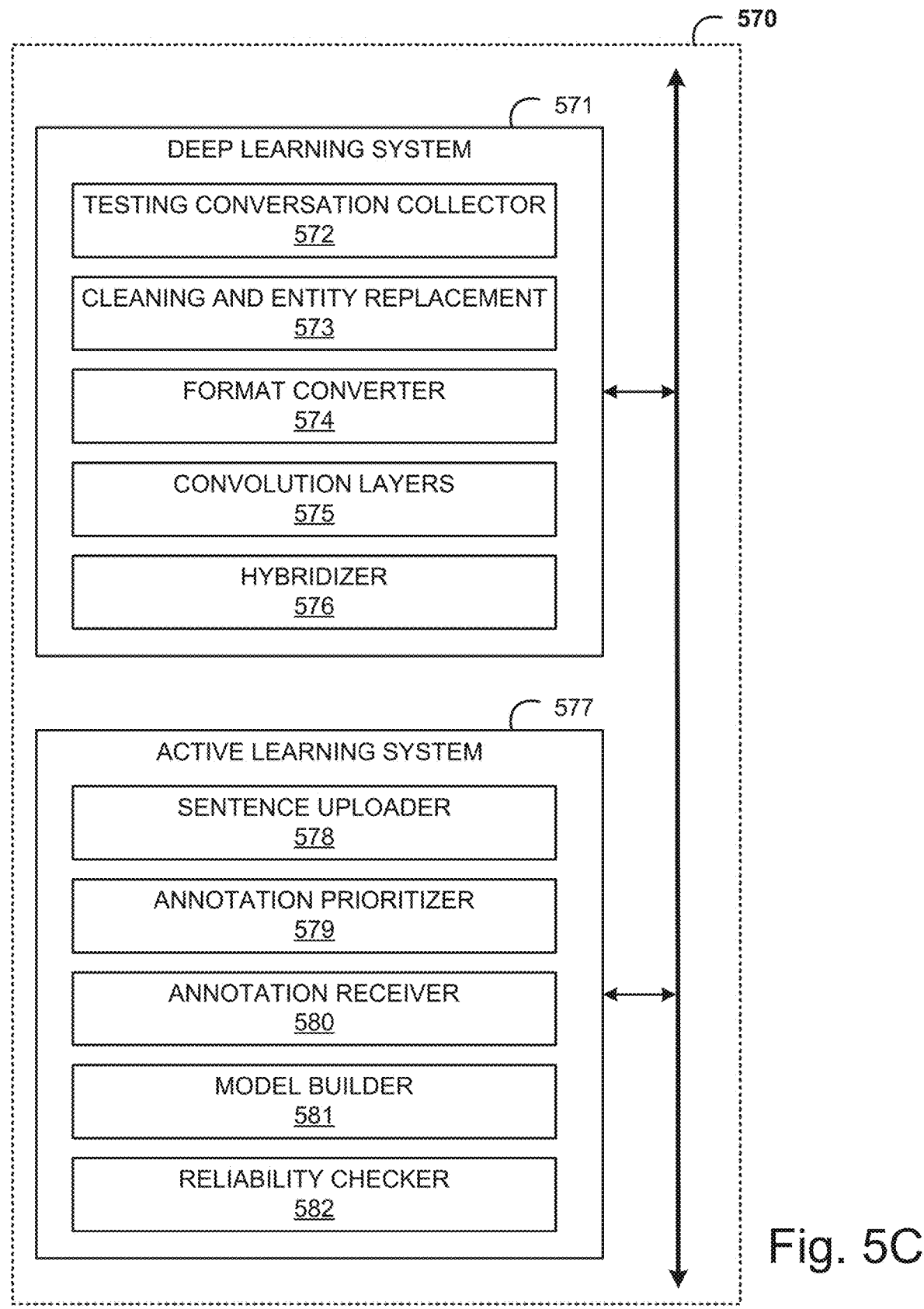
FIG. 5C is an example logical diagram of a learning system within the message response system, in accordance with some embodiment.

FIG. 5C provides an example diagram of the learning systems 570 that include deep learning systems 571 and active learning systems 577. The deep learning system 571 includes additional components that collect testing conversations 572, clean and perform entity replacement 573, format the response to utterance, context and label 574, and then embed the output and process it through multiple convolution filter layers and pooling layers 575 to generate deep learning outputs. These outputs may then be combined with traditional machine learning models via a hybridizer 576. Similarly, the active learning system 577 utilizes a sentence uploader 578 for collecting training data. Annotations are prioritized for the training data 579, and these prioritized annotations are received 580 from a human operator. These received annotations are leveraged to build out the machine learning model 581 and reliability of the annotations and models are checked by a checker 582. If the model is below a required threshold of accuracy, the system may reiterate the process of collecting sentences and annotating them for model updating.

Most of the traditional supervised machine learning and deep learning algorithms require a lot of labeled data, and getting all of them labeled is a time consuming and cost intensive task. Therefore, the end-to-end active learning framework disclosed, which leverages human annotators to label only those examples where the underlying algorithms are most uncertain is utilized to improve the efficiency and accuracy of the models while reducing the amount of labeled data required. Active Learning invokes with a small bootstrapped file consisting of a balanced training set and a large unlabeled file. Several query strategies are utilized on data sets including but not limited to Uncertainty Sampling, Entropy based approach, Query by committee approach. In Uncertainty Sampling, active learning system chooses least confident examples based on the probability values. In entropy based query strategy, decision will be made on the basis of the resulting entropy of the unlabeled data set. For query by committee, different models will be trained on bootstrapping data set and only those input sentences are sent to the annotation tool where there is a strong disagreement between the output of the models. Approaches based on error reduction such as expectation minimization of error or labeling the points will contribute significantly to the output variance. Most of these approaches boil down to finding the optimal balance between exploration and exploitation over the entire data space such as a multi-armed bandit problem.

Figure 5D:
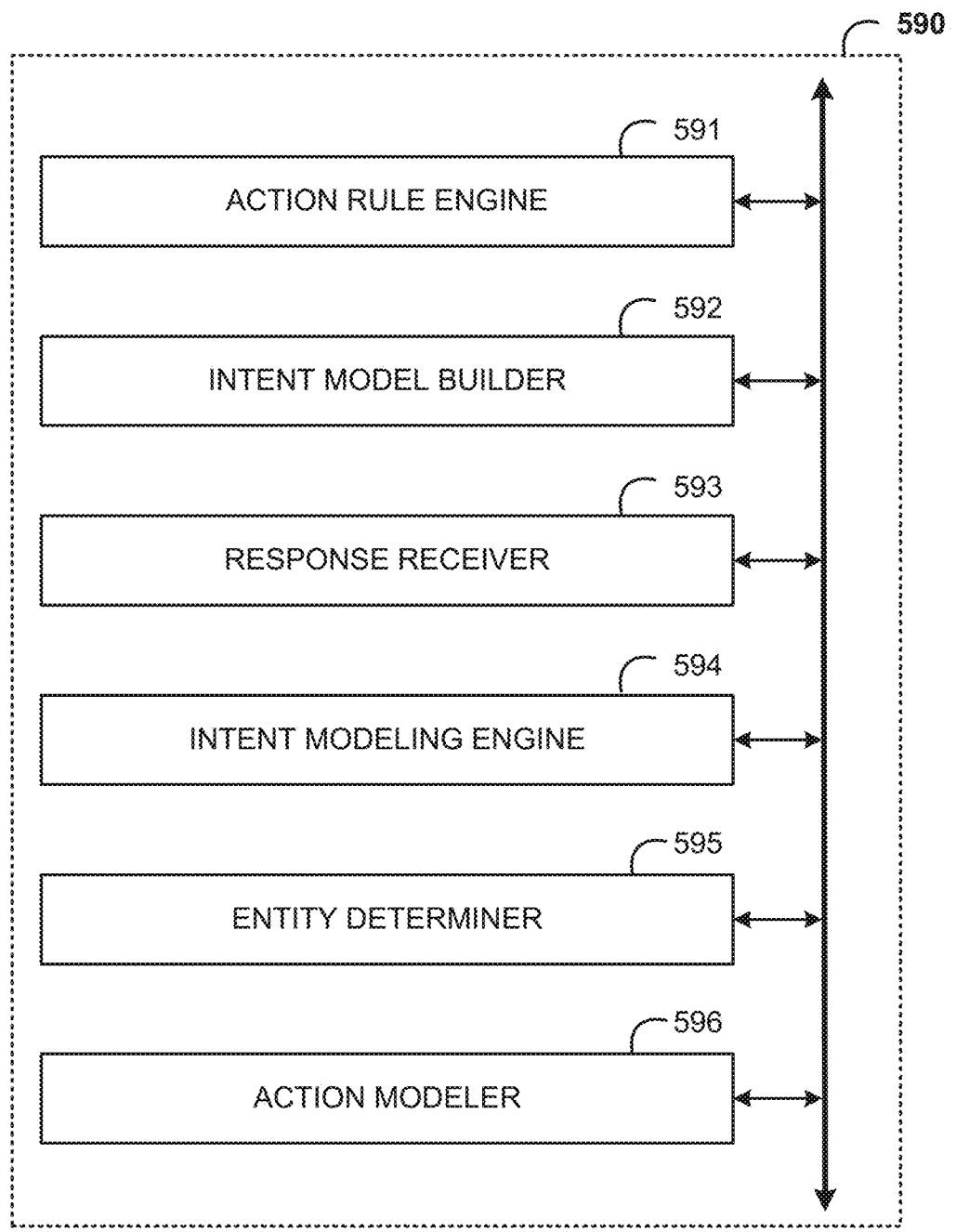
FIG. 5D is an example logical diagram of a intent based action decision engine within the message response system, in accordance with some embodiment.

Turning to FIG. 5D, components of the intent based decision engine 590 are shown. This system leverages the models previously generated to perform intent based decision making that generally out performs traditional action response engines. This system starts with an action rule engine 591 that allows a user to manually set up rules for actions based upon classification outputs. An intent model is then generated by the intent model builder 592, which may leverage any of the previously discussed modeling components. Responses are then received 593, and an intent model engine 594 is applied to determine the intention behind the response. Entities are also determined by a determiner 595 using models for entity extraction. An action modeler 596 uses the intention information, in conjunction with the entity information, to determine an appropriate action for the response.

II. Methods

Now that the systems for dynamic messaging, model generation, and action determination have been broadly described, attention will be turned to processes employed to provide automatic learning and updating of machine learning, as well as example processes for deep learning techniques, active learning, frequently asked questions with approved answers, how these models may be utilized for intent based classification, and the employment of reward based AIs for smart assistants.

Figure 6:
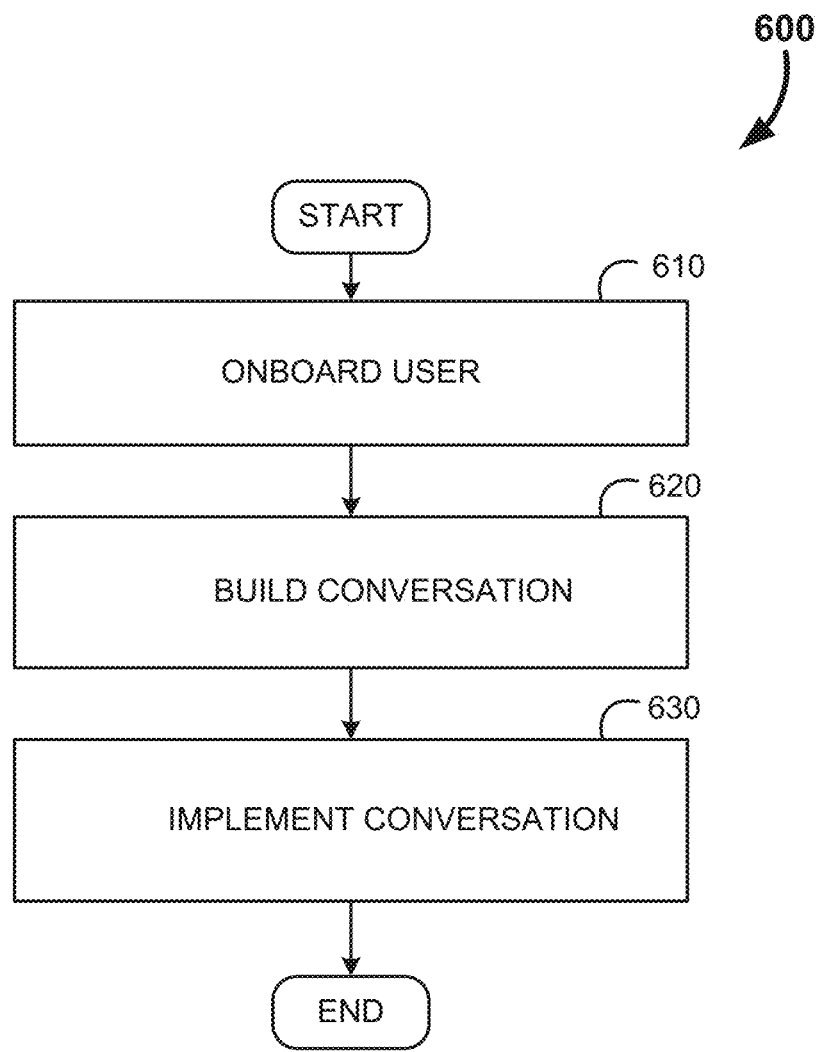
FIG. 6 is an example flow diagram for a dynamic message conversation, in accordance with some embodiment.

In FIG. 6 an example flow diagram for a dynamic message conversation is provided, shown generally at 600. The process can be broadly broken down into three portions: the on-boarding of a user (at 610), conversation generation (at 620) and conversation implementation (at 630). The following figures and associated disclosure will delve deeper into the specifics of these given process steps.

Figure 7:
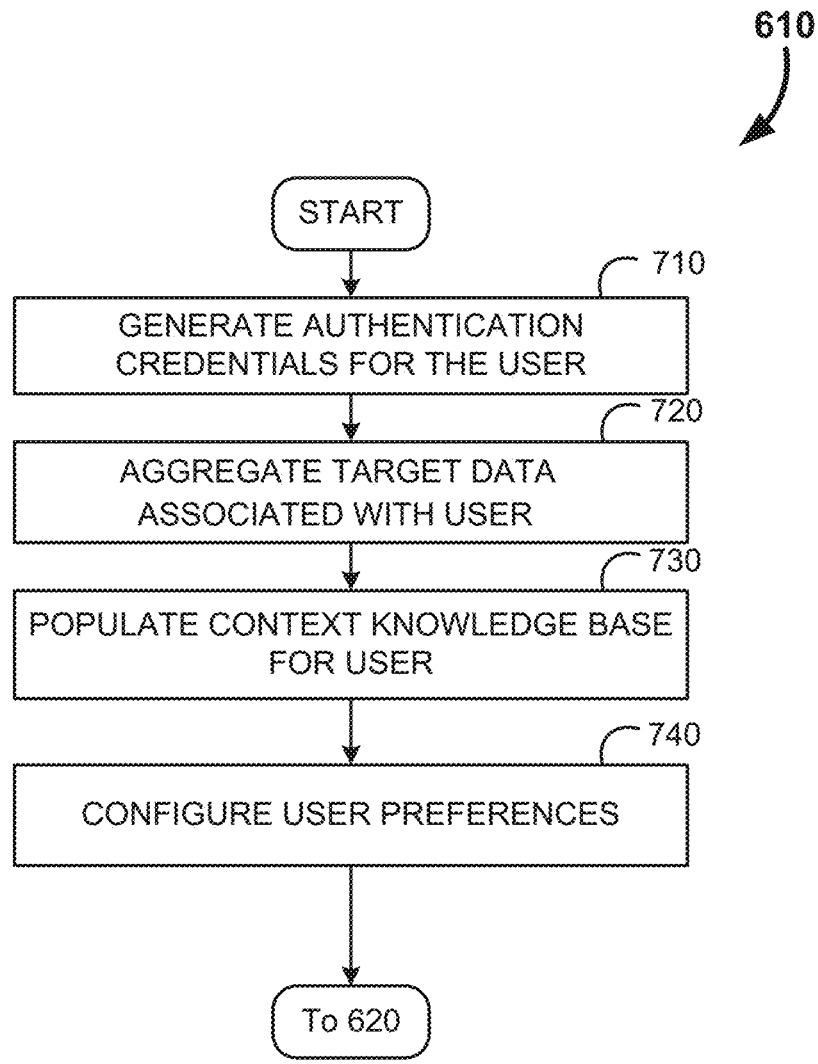
FIG. 7 is an example flow diagram for the process of on-boarding a business actor, in accordance with some embodiment.

FIG. 7, for example, provides a more detailed look into the on-boarding process, shown generally at 610. Initially a user is provided (or generates) a set of authentication credentials (at 710). This enables subsequent authentication of the user by any known methods of authentication. This may include username and password combinations, biometric identification, device credentials, etc.

Next, the lead data associated with the user is imported, or otherwise aggregated, to provide the system with a lead database for message generation (at 720). Likewise, context knowledge data may be populated as it pertains to the user (at 730). Often there are general knowledge data sets that can be automatically associated with a new user; however, it is sometimes desirable to have knowledge sets that are unique to the user's conversation that wouldn't be commonly applied. These more specialized knowledge sets may be imported or added by the user directly.

Lastly, the user is able to configure their preferences and settings (at 740). This may be as simple as selecting dashboard layouts, to configuring confidence thresholds required before alerting the user for manual intervention.

Figure 8:
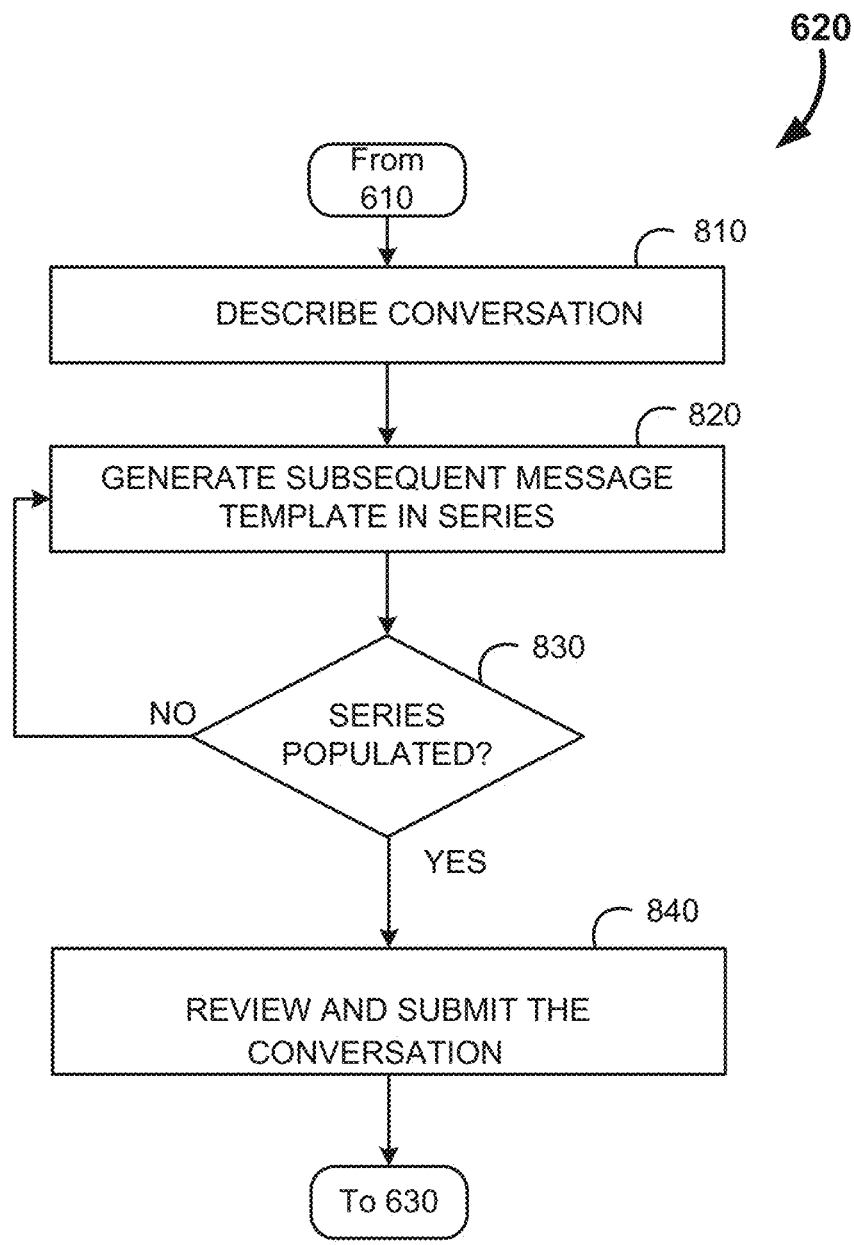
FIG. 8 is an example flow diagram for the process of building a business activity such as conversation, in accordance with some embodiment.

Moving on, FIG. 8 is the example flow diagram for the process of building a conversation, shown generally at 620. The user initiates the new conversation by first describing it (at 810). Conversation description includes providing a conversation name, description, industry selection, and service type. The industry selection and service type may be utilized to ensure the proper knowledge sets are relied upon for the analysis of responses.

Figure 9:
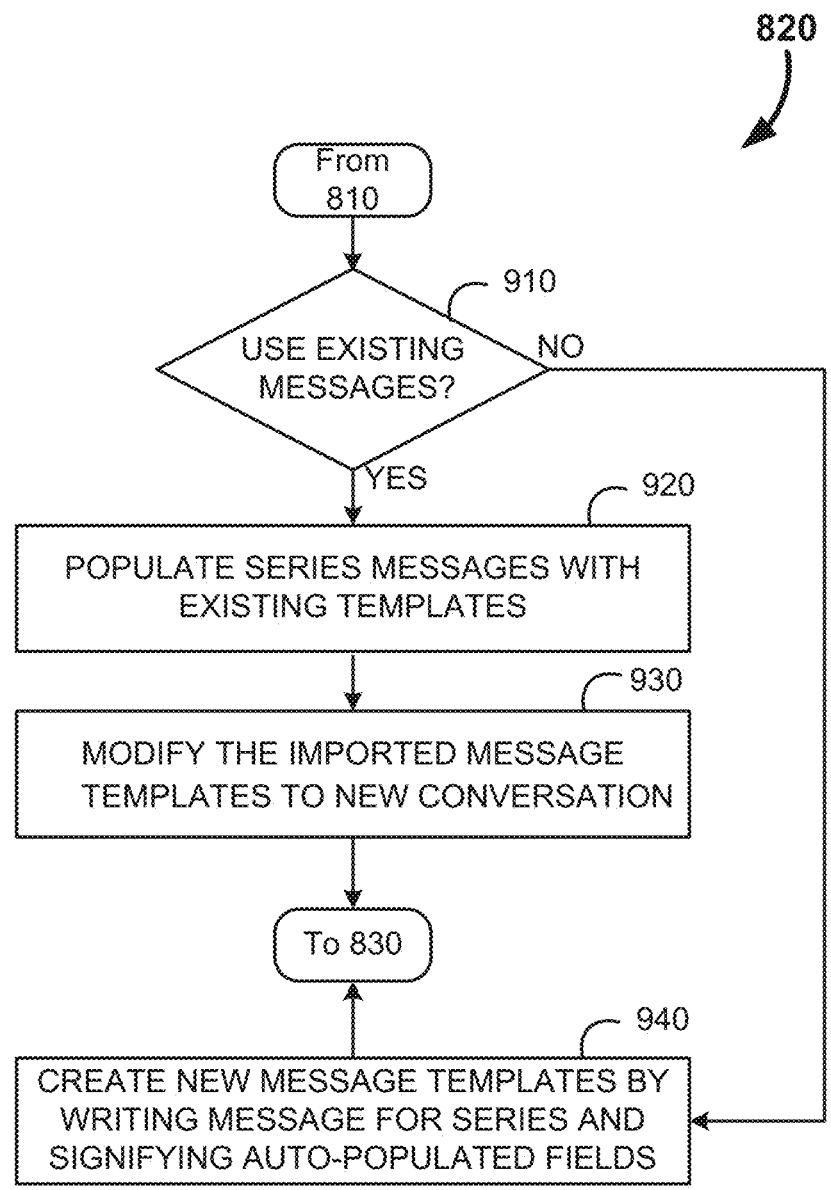
FIG. 9 is an example flow diagram for the process of generating message templates, in accordance with some embodiment.

After the conversation is described, the message templates in the conversation are generated (at 820). If the series is populated (at 830), then the conversation is reviewed and submitted (at 840). Otherwise, the next message in the template is generated (at 820). FIG. 9 provides greater details of an example of this sub-process for generating message templates. Initially the user is queried if an existing conversation can be leveraged for templates, or whether a new template is desired (at 910).

If an existing conversation is used, the new message templates are generated by populating the templates with existing templates (at 920). The user is then afforded the opportunity to modify the message templates to better reflect the new conversation (at 930). Since the objectives of many conversations may be similar, the user will tend to generate a library of conversations and conversation fragments that may be reused, with or without modification, in some situations. Reusing conversations has time saving advantages, when it is possible.

However, if there is no suitable conversation to be leveraged, the user may opt to write the message templates from scratch using the Conversation Editor (at 940). When a message template is generated, the bulk of the message is written by the user, and variables are imported for regions of the message that will vary based upon the lead data. Successful messages are designed to elicit responses that are readily classified. Higher classification accuracy enables the system to operate longer without user interference, which increases conversation efficiency and user workload.

Figure 10:
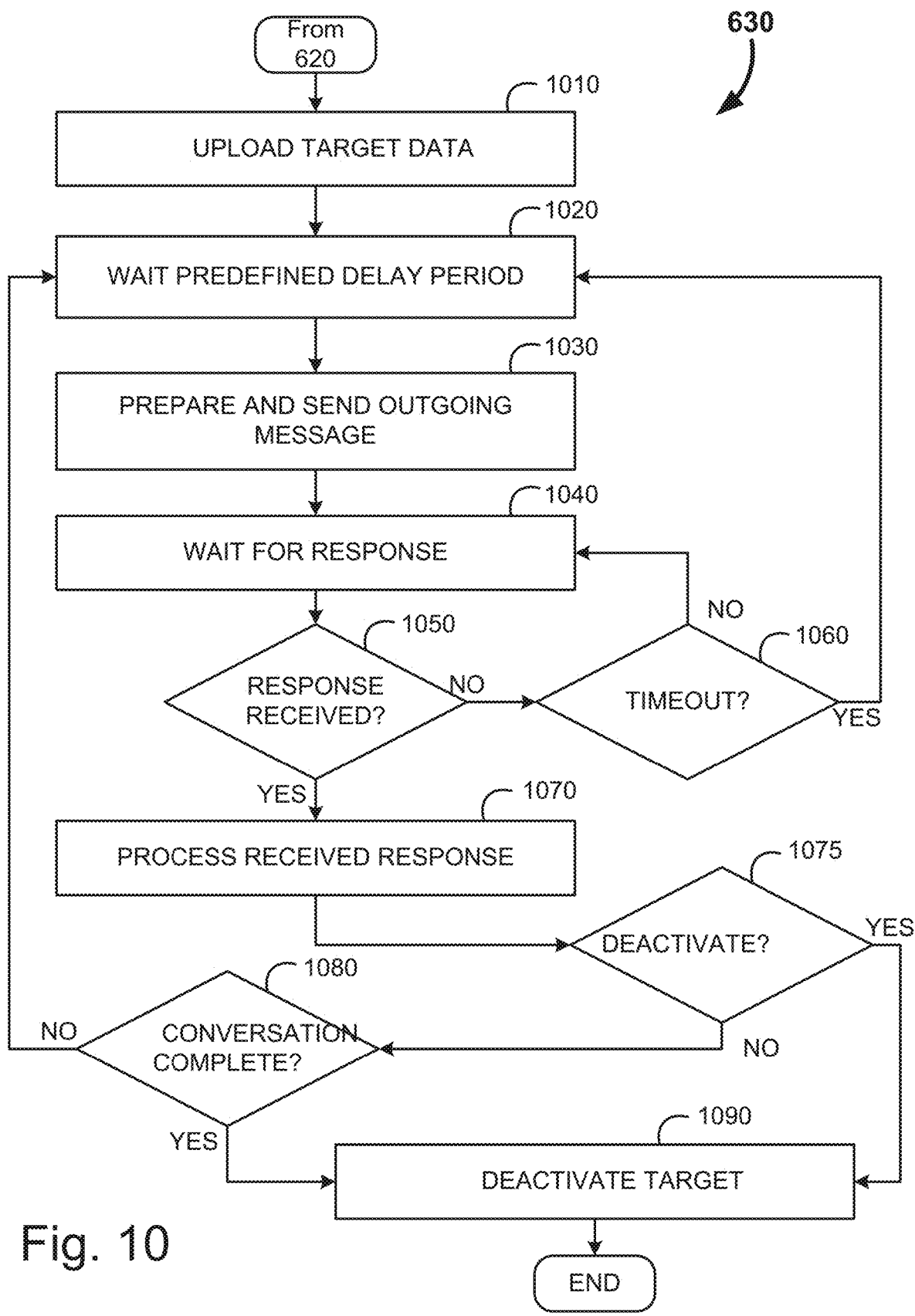
FIG. 10 is an example flow diagram for the process of implementing the conversation, in accordance with some embodiment.

Once the conversation has been built out it is ready for implementation. FIG. 10 is an example flow diagram for the process of implementing the conversation, shown generally at 630. Here the lead data is uploaded (at 1010). Lead data may include any number of data types, but commonly includes lead names, contact information, date of contact, item the lead was interested in, etc. Other data can include open comments that leads supplied to the lead provider, any items the lead may have to trade in, and the date the lead came into the lead provider's system. Often lead data is specific to the industry, and individual users may have unique data that may be employed.

An appropriate delay period is allowed to elapse (at 1020) before the message is prepared and sent out (at 1030). The waiting period is important so that the lead does not feel overly pressured, nor the user appears overly eager. Additionally, this delay more accurately mimics a human correspondence (rather than an instantaneous automated message). Additionally, as the system progresses and learns, the delay period may be optimized by the cadence optimizer to be ideally suited for the given message, objective, industry involved, and actor receiving the message. This cadence optimization is described in greater detail later in this disclosure.

Figure 11:
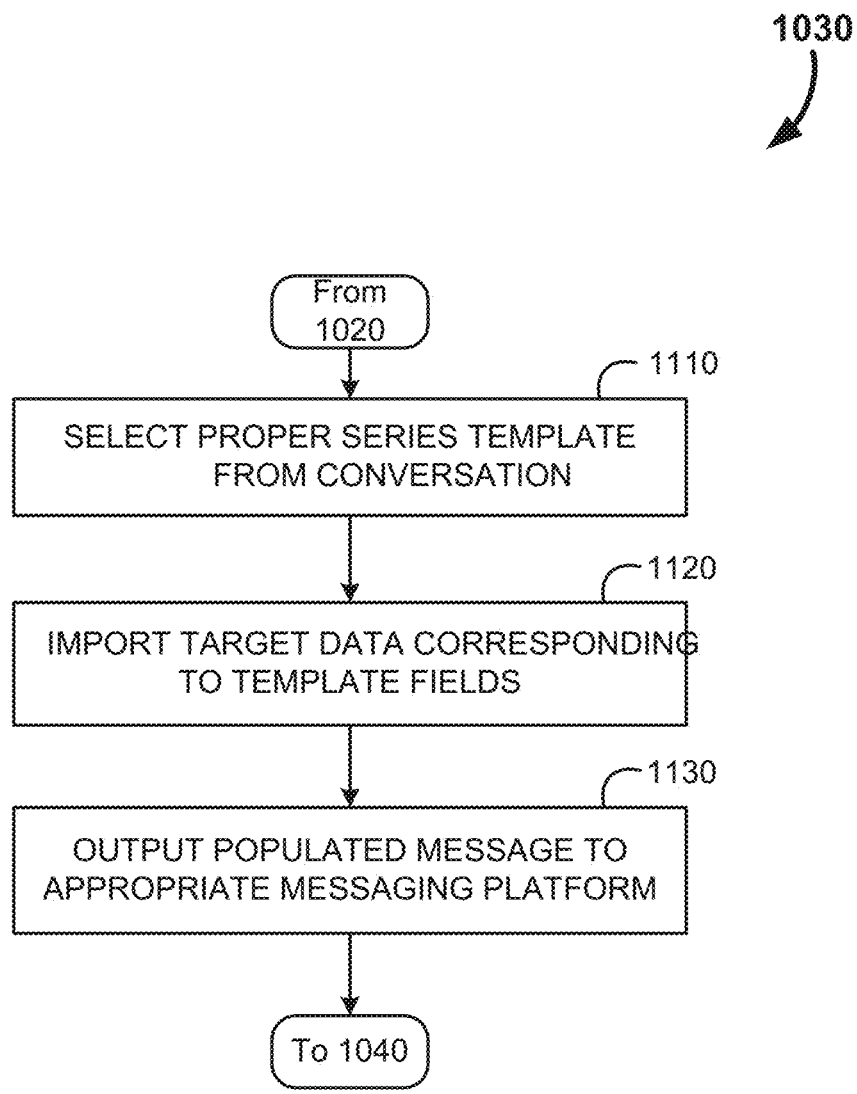
FIG. 11 is an example flow diagram for the process of preparing and sending the outgoing message, in accordance with some embodiment.

FIG. 11 provides a more detailed example of the message preparation and output. In this example flow diagram, the message within the series is selected based upon which objectives are outstanding (at 1110). Typically, the messages will be presented in a set order; however, if the objective for a particular lead has already been met for a given series, then another message may be more appropriate. Likewise, if the recipient didn't respond as expected, or not at all, it may be desirous to have alternate message templates to address the lead most effectively.

After the message template is selected from the series, the lead data is parsed through, and matches for the variable fields in the message templates are populated (at 1120). The populated message is output to the communication channel appropriate messaging platform (at 1130), which as previously discussed typically includes an email service, but may also include SMS services, instant messages, social networks, audio networks using telephony or speakers and microphone, or video communication devices or networks or the like. In some embodiments, the contact receiving the messages may be asked if he has a preferred channel of communication. If so, the channel selected may be utilized for all future communication with the contact. In other embodiments, communication may occur across multiple different communication channels based upon historical efficacy and/or user preference. For example, in some particular situations a contact may indicate a preference for email communication. However, historically, in this example, it has been found that objectives are met more frequently when telephone messages are utilized. In this example, the system may be configured to initially use email messaging with the contact, and only if the contact becomes unresponsive is a phone call utilized to spur the conversation forward. In another embodiment, the system may randomize the channel employed with a given contact, and over time adapt to utilize the channel that is found to be most effective for the given contact.

Returning to FIG. 10, after the message has been output, the process waits for a response (at 1040). If a response is not received (at 1050) the process determines if the wait has been timed out (at 1060). Allowing a lead to languish too long may result in missed opportunities; however, pestering the lead too frequently may have an adverse impact on the relationship. As such, this timeout period may be user defined and will typically depend on the communication channel. Often the timeout period varies substantially, for example for email communication the timeout period could vary from a few days to a week or more. For real-time chat communication channel implementations, the timeout period could be measured in seconds, and for voice or video communication channel implementations, the timeout could be measured in fractions of a second to seconds. If there has not been a timeout event, then the system continues to wait for a response (at 1050). However, once sufficient time has passed without a response, it may be desirous to return to the delay period (at 1020) and send a follow-up message (at 1030). Often there will be available reminder templates designed for just such a circumstance.

Figure 12:
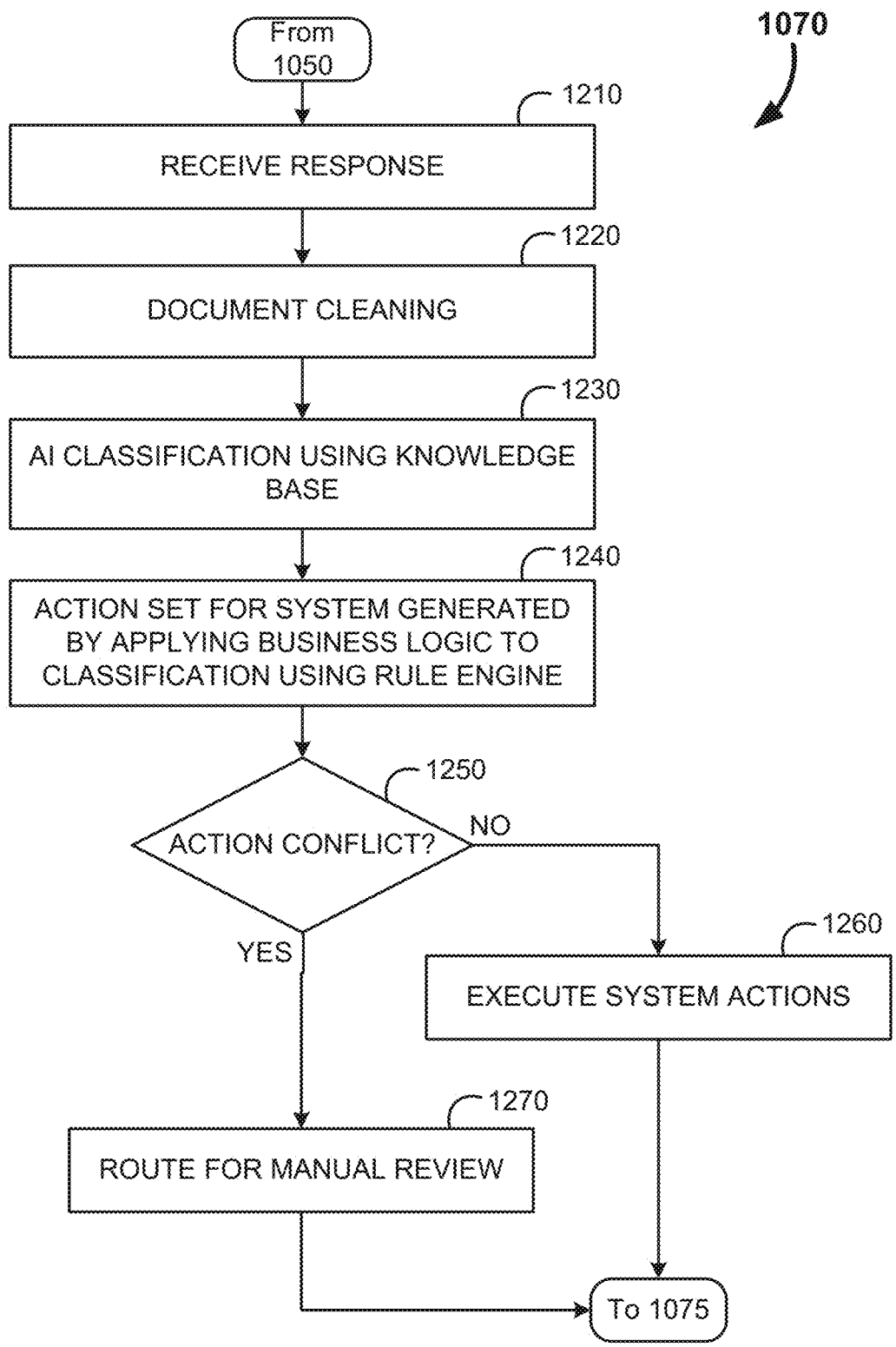
FIG. 12 is an example flow diagram for the process of processing received responses, in accordance with some embodiment.

However, if a response is received, the process may continue with the response being processed (at 1070). This processing of the response is described in further detail in relation to FIG. 12. In this sub-process, the response is initially received (at 1210) and the document may be cleaned (at 1220).

Figure 13:
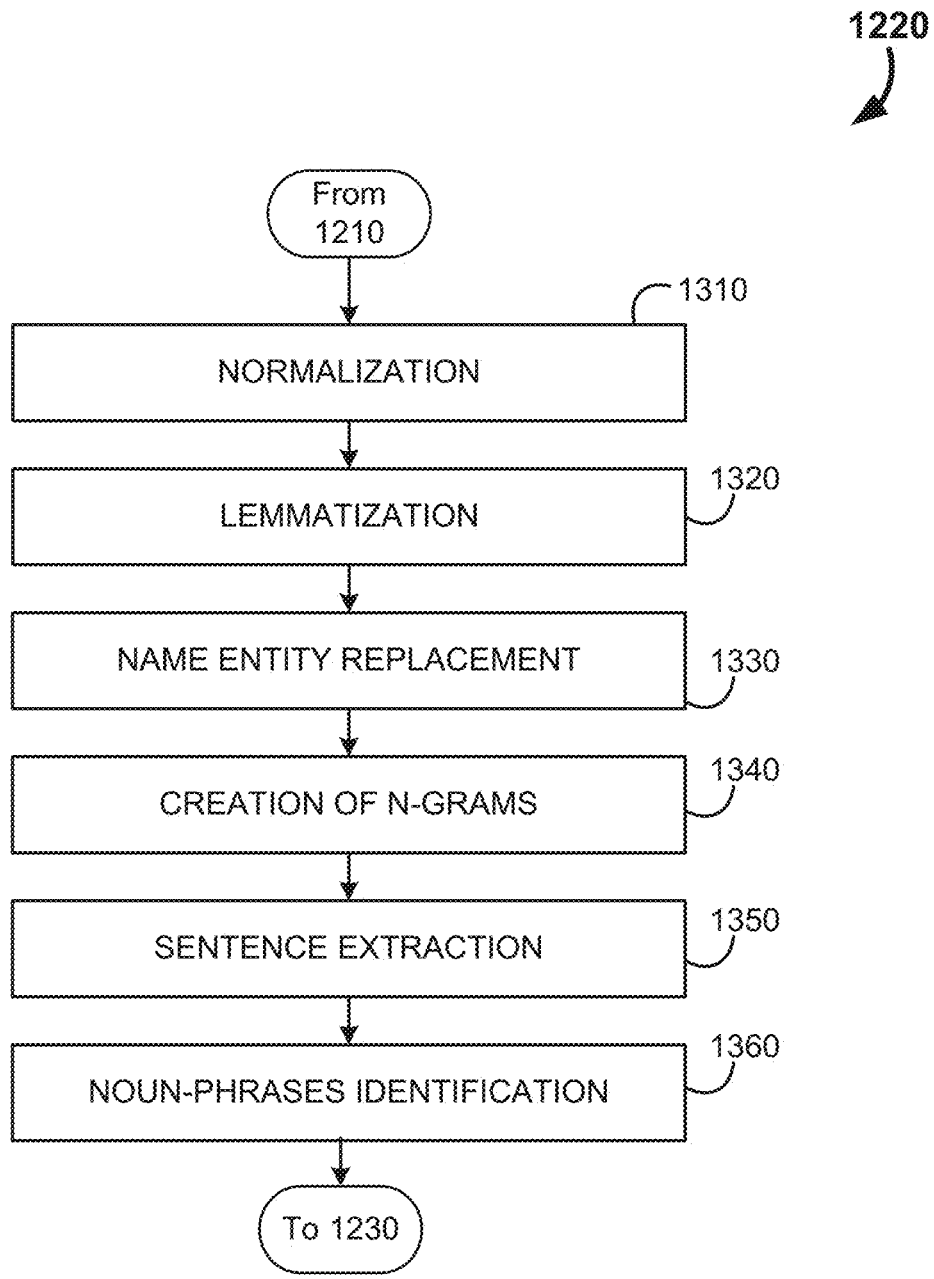
FIG. 13 is an example flow diagram for the process of document cleaning, in accordance with some embodiment.

Document cleaning is described in greater detail in relation with FIG. 13. Upon document receipt, adapters may be utilized to extract information from the document for shepherding through the cleaning and classification pipelines. For example, for an email, adapters may exist for the subject and body of the response, often a number of elements need to be removed, including the original message, HTML encoding for HTML style responses, enforce UTF-8 encoding so as to get diacritics and other notation from other languages, and signatures so as to not confuse the AI. Only after all this removal process does the normalization process occur (at 1310) where characters and tokens are removed in order to reduce the complexity of the document without changing the intended classification.

After the normalization, documents are further processed through lemmatization (at 1320), name entity replacement (at 1330), the creation of n-grams (at 1340) sentence extraction (at 1350), noun-phrase identification (at 1360) and extraction of out-of-office features and/or other named entity recognition (at 1370). Each of these steps may be considered a feature extraction of the document. Historically, extractions have been combined in various ways, which results in an exponential increase in combinations as more features are desired. In response, the present method performs each feature extraction in discrete steps (on an atomic level) and the extractions can be "chained" as desired to extract a specific feature set.

Returning to FIG. 12, after document cleaning, the document is then provided to the AI platform for classification using the knowledge sets (at 1230). The system initially applies natural language processing through one or more AI machine learning models to process the message for concepts contained within the message. As previously mentioned, there are a number of known algorithms that may be employed to categorize a given document, including Hardrule, Naïve Bayes, Sentiment, neural nets including convolutional neural networks and recurrent neural networks and variations, k-nearest neighbor, other vector based algorithms, etc. to name a few. In some embodiments, the classification model may be automatically developed and updated as previously touched upon, and as described in considerable detail below as well. Classification models may leverage deep learning and active learning techniques as well, as will also be discussed in greater detail below.

After the classification has been generated, the system renders insights from the message. Insights are categories used to answer some underlying question related to the document. The classifications may map to a given insight based upon the context of the conversation message. A confidence score, and accuracy score, are then generated for the insight. Insights are used by the model to generate actions.

Objectives of the conversation, as they are updated, may be used to redefine the actions collected and scheduled. For example, 'skip-to-follow-up' action may be replaced with an 'informational message' introducing the sales rep before proceeding to 'series 3' objectives. Additionally, 'Do Not Email' or 'Stop Messaging' classifications should deactivate a lead and remove scheduling at any time during a lead's life-cycle. Insights and actions may also be annotated with "facts". For example, if the determined action is to "check back later" this action may be annotated with a date 'fact' that indicates when the action is to be implemented.

Returning to FIG. 12, the actions received from the inference engine may be set (at 1240). A determination is made whether there is an action conflict (at 1250). Manual review may be needed when such a conflict exists (at 1270). Otherwise, the actions may be executed by the system (at 1260).

Returning to FIG. 10, after the response has been processed, a determination is made whether to deactivate the lead (at 1075). Such a deactivation may be determined as needed when the lead requests it. If so, then the lead is deactivated (at 1090). If not, the process continues by determining if the conversation for the given lead is complete (at 1080). The conversation may be completed when all objectives for the lead have been met, or when there are no longer messages in the series that are applicable to the given lead. Once the conversation is completed, the lead may likewise be deactivated (at 1090).

However, if the conversation is not yet complete, the process may return to the delay period (at 1020) before preparing and sending out the next message in the series (at 1030). The process iterates in this manner until the lead requests deactivation, or until all objectives are met. This concludes the main process for a comprehensive messaging conversation. Attention will now be focused on processes for model generation and automatic updating, deep learning, active learning, and usage of these models and methods for frequently asked questions with approved answers and AI assistants.

Figure 14:
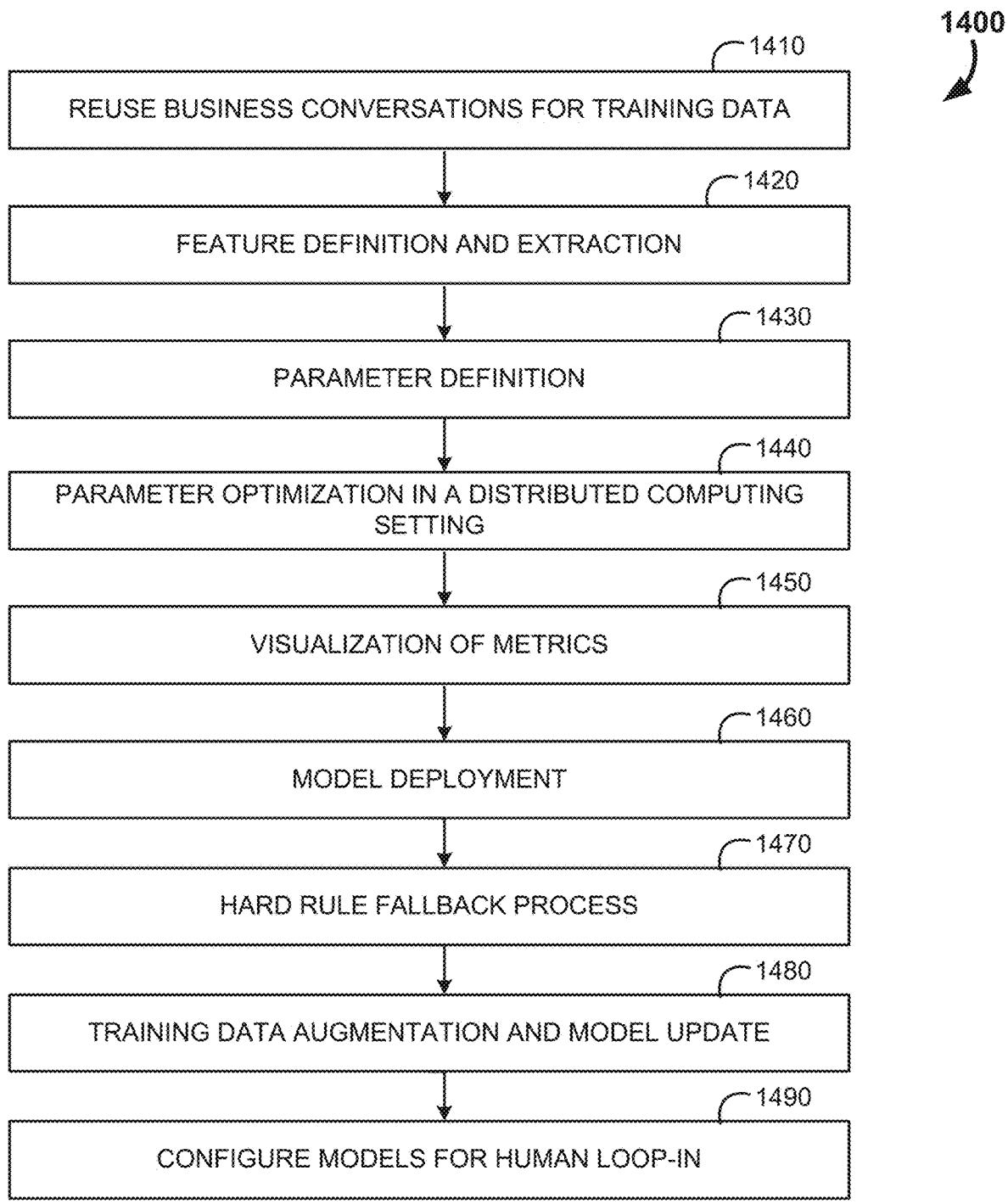
FIG. 14 is an example flow diagram for the process automated model learning and updating, in accordance with some embodiment.
Figure 15:
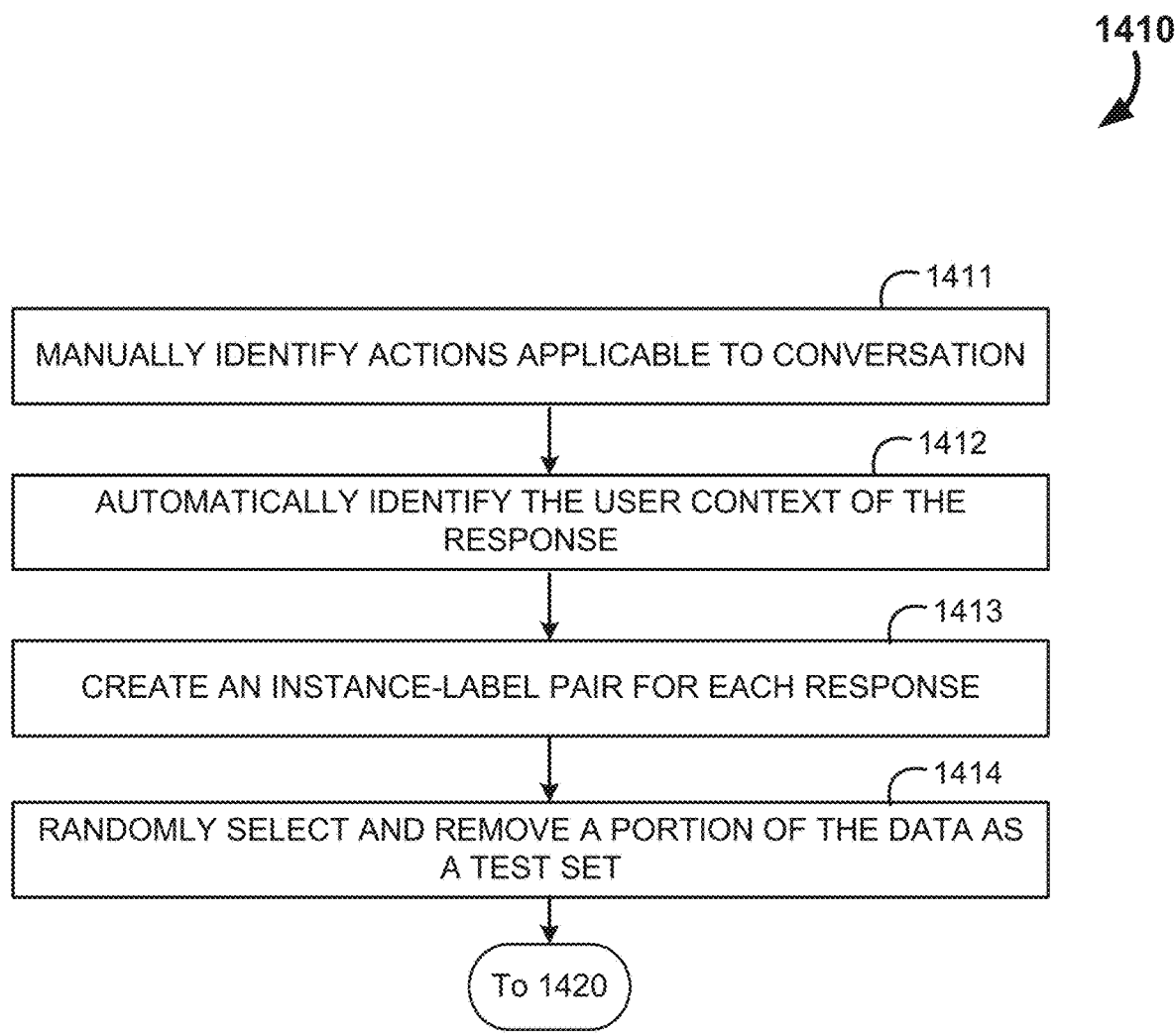
FIG. 15 is an example flow diagram for the process of reusing conversations as training data, in accordance with some embodiment.

Particularly, turning to FIG. 14, a process 1400 for automated model learning and updating is provided, in accordance with some embodiment. In this process, conversations are reused as a source of training data (at 1410). FIG. 15 provides more detail into this step. Actions applicable to the conversations are manually identified (at 1411). The system automatically identifies the context of the response (at 1412). As noted previously, "context" of the conversation art relevant attributes such as medium, time, sender information, etc. Instance-label pairs for the responses are created (at 1413) as discussed previously. Next, the system randomly selects and removes a portion of the data as a test set (at 1414). In some embodiments, a default of 5000 instance-label pairs may be randomly selected as the training set.

Figure 16:
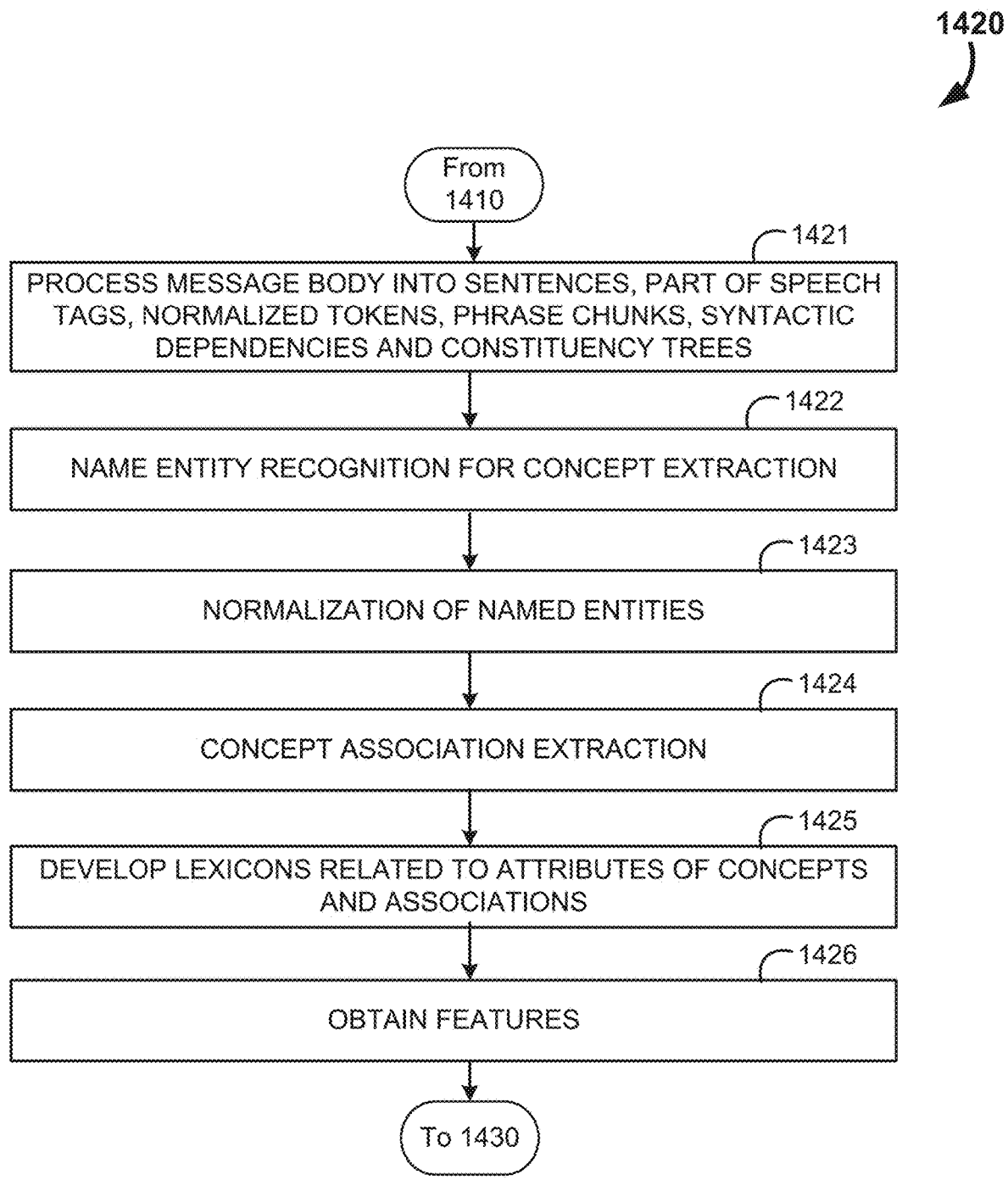
FIG. 16 is an example flow diagram for the process of feature definition and extraction, in accordance with some embodiment.

Returning to FIG. 14, after the training set has been collected, features are defined and extracted (at 1420). FIG. 16 provides more detail into this step. The message body for the training set are processed into sentences, parts of speech, normalized tokens, phrase chunks, syntactical dependencies and constituency trees (at 1421). Name entity recognition is then performed (at 1422) for concept extraction. The named entities are normalized (at 1423) and concept associations are extracted (at 1424). A lexicon of related attributes of concepts and their associations is generated (at 1425) and features are obtained (at 1426) by combining and permuting the normalized name entities and concept associations.

Returning to FIG. 14, after feature extraction, the parameters of the model are defined (at 1430). As previously discussed, a number of classification algorithms may be utilized and for each algorithm, the parameters utilized can be identified. Subsequently, the parameters for each of these classification algorithms may be optimized for in a distributed computing environment (at 1440). Parameter optimization may utilize a number of searching algorithms as discussed previously, which extract component features, optimize the combination set of component feature, optimize the top-performing machine learning algorithms along their parameters and optimize the best ensemble of top-performing machine learning algorithms.

Figure 17:
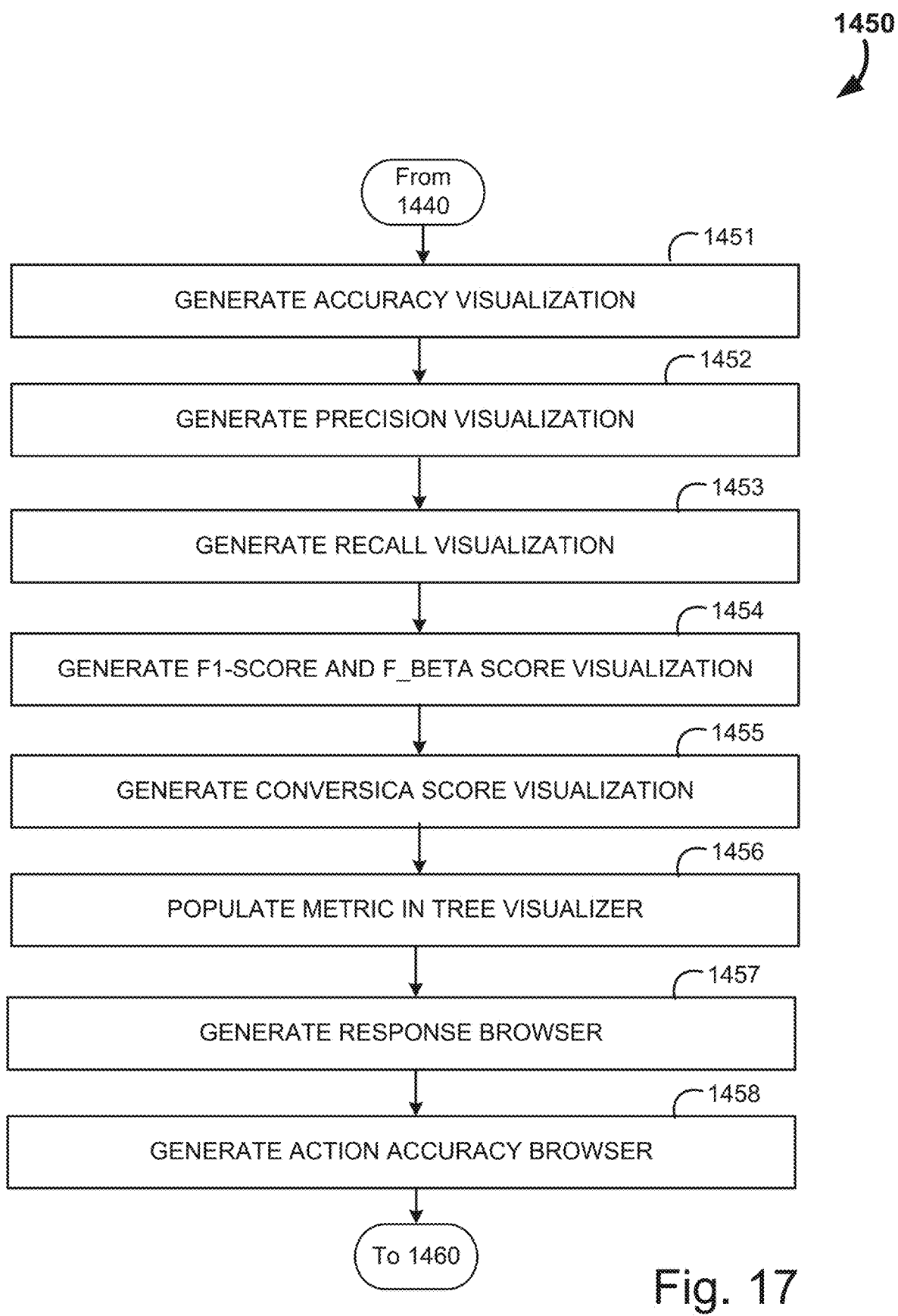
FIG. 17 is an example flow diagram for the process of visualizing metrics, in accordance with some embodiment.

After parameter optimization, the metrics for the models are visualized (at 1450). FIG. 17 provides more detail into this step. For metric visualization, an accuracy visualization is generated (at 1451), as are a precision visualization (at 1452), a recall visualization (at 1453), a f1-score and f beta score visualization (at 1454), and a conversica score visualization (at 1455). These visualizations are populated into a tree visualizer interface (at 1456) as previously discussed. As already noted, an example of such an interface may be seen in relation to FIG. 21. A response browser may also be generated (at 1457) as previously discussed. As already noted, an example of such an interface may be seen in relation to FIG. 22. Lastly, an action accuracy browser may also be generated (at 1458) as previously discussed. As already noted, an example of such an interface may be seen in relation to FIG. 23.

Figure 18:
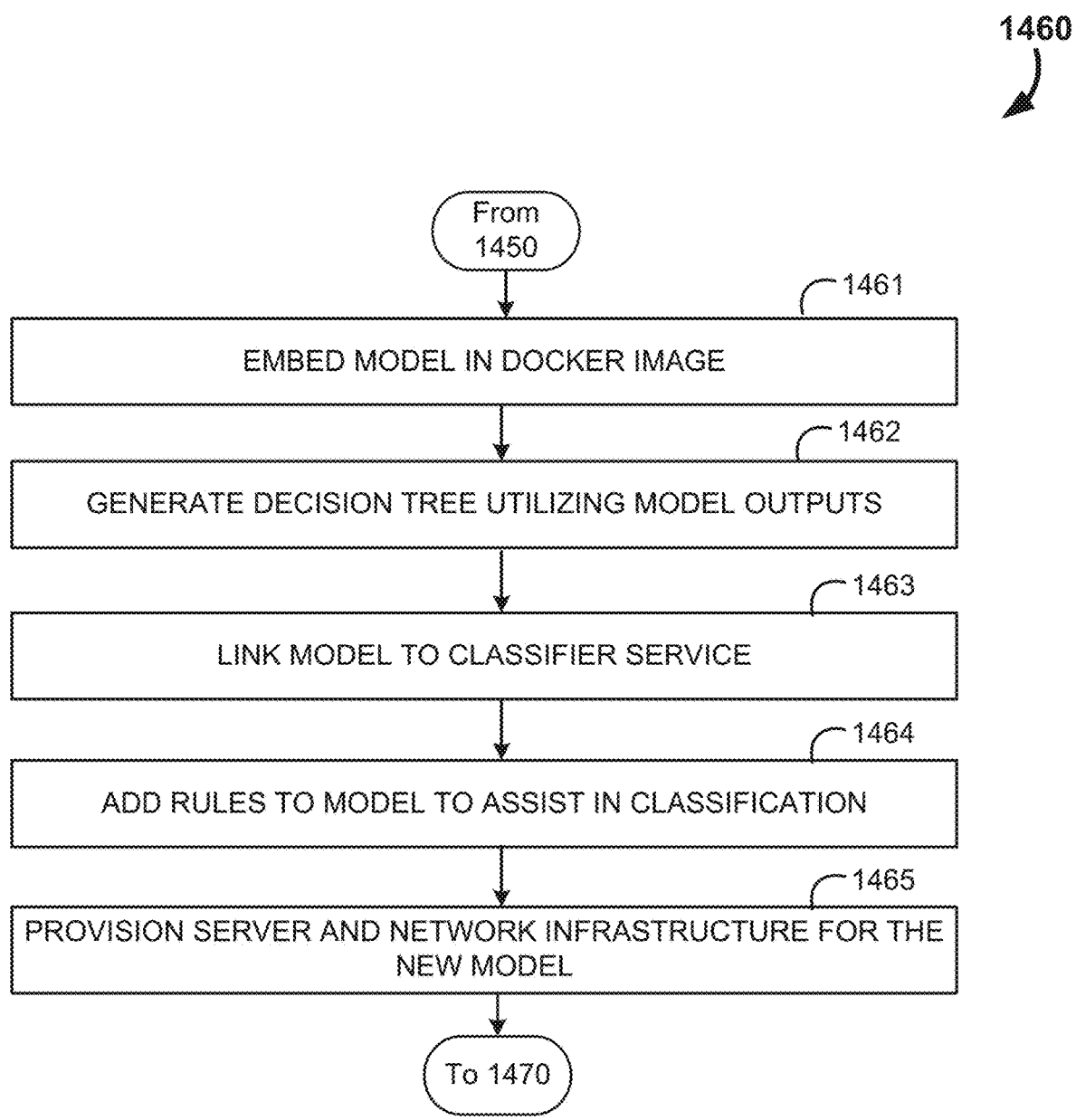
FIG. 18 is an example flow diagram for the process of model deployment, in accordance with some embodiment.

Returning to FIG. 14, after metrics are visualized, the models may be deployed (at 1460), which is described in further detail in relation to the example process shown at FIG. 18. The model is embedded in a docker image (at 1461) and a decision tree utilizing the model outputs is generated (at 1462). The model is linked to a classifier service (at 1463), and rules are added to the model to assist in classification (at 1464). Lastly, a server and network infrastructure are provisioned for the new model (at 1465).

Figure 19:
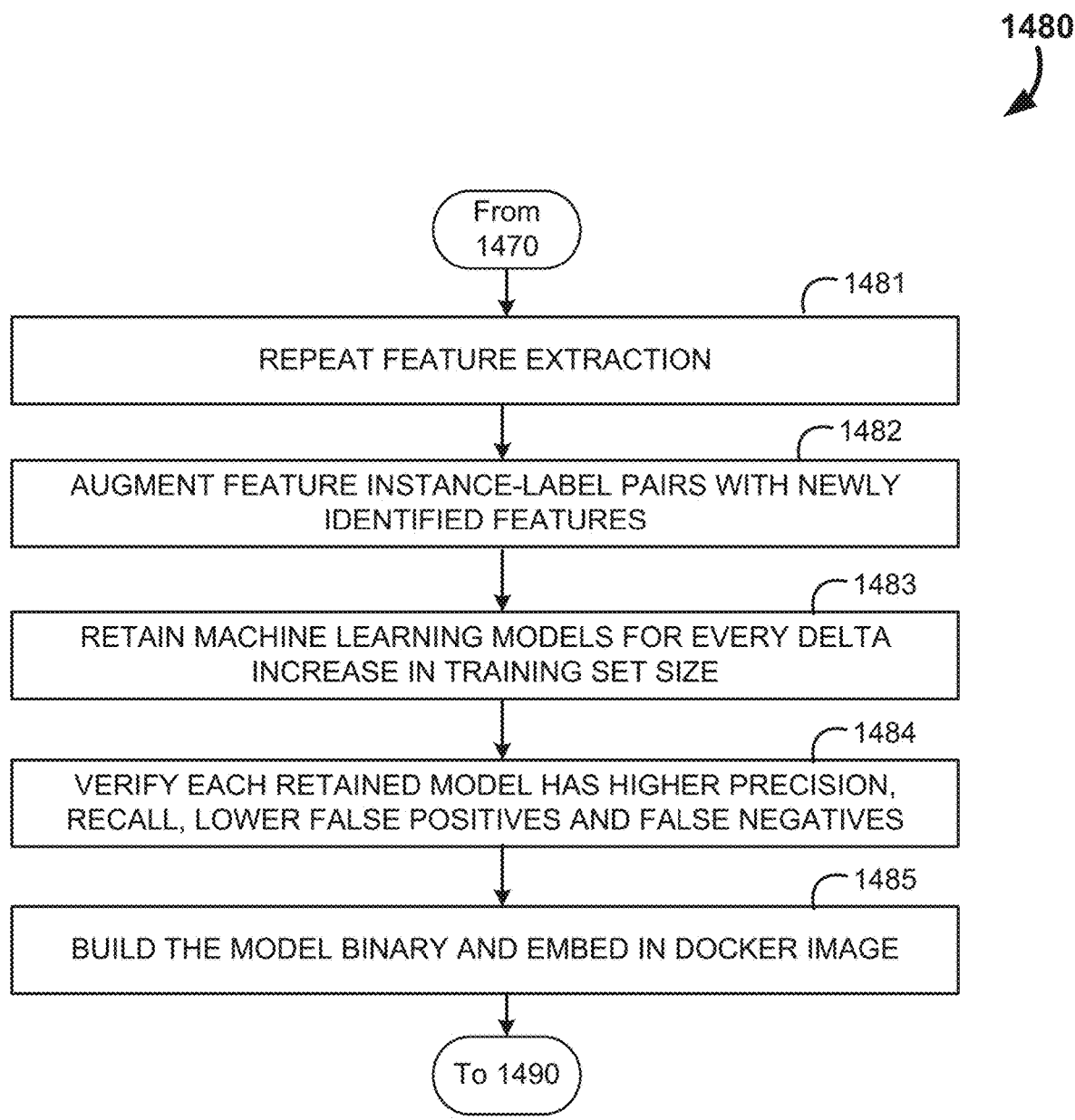
FIG. 19 is an example flow diagram for the process of training data augmentation, in accordance with some embodiment.

Returning to FIG. 14, after model deployment, a hard rule fallback process is performed (at 1470). This hard rule fallback process may be employed when the deployed model falls below a confidence threshold, but before a human intervention is required. In some cases, deficiency in the model may be adequately addressed utilizing more traditional hard rule processes, thereby enabling continued automated performance by the system. Subsequently, training data may be augmented (at 1480), which is described in greater detail in relation to the example process of FIG. 19.

Initially, feature extraction is repeated on newly received conversation responses (at 1481) to generate a new set of instance-label pairs for the new conversation data. The existing training instance-label pairs may be augmented with these new instance-label pairs (at 1482). The model version may be retained based upon a delta in training sample size (at 1483). For example, for every 10% increase in training sample set size, the model may be saved as an updated version. These versions may be verified against earlier versions using known input-output pairs to determine model precision, accuracy, recall, false positive and false negative rates (at 1484). Only superior models are then used to build out a model binary and deployed using a docker image (at 1485).

Figure 20:
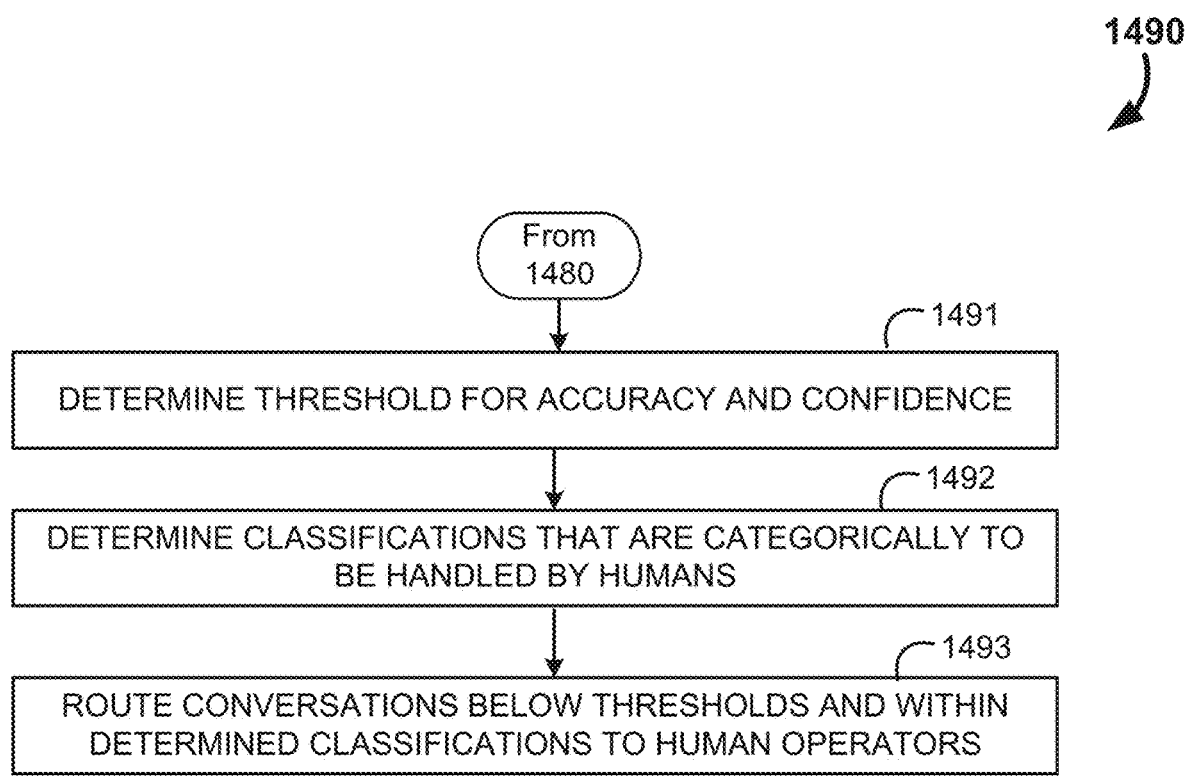
FIG. 20 is an example flow diagram for the process of configuring models for human loop-in, in accordance with some embodiment.

Returning to FIG. 14, after the automated augmentation of training data (which is a continual iterative process), the process also configures the models for human loop-in (at 1490). FIG. 20 provides more details into this human loop-in process. Human loop-in is costly and a bottleneck for system operation, therefore the involvement of humans is purposefully limited to instances where such involvement is truly required. This may be done through the configuration of a threshold value for accuracy and confidence for the model (at 1491). Classifications that are not meeting these thresholds may be routed to a human for disambiguation, or may trigger machine generated conversation options to ask the lead or user to aid in disambiguation. Additionally, in order to improve computational efficiency, determinations of classification categories to be handled by humans may also be defined (at 1492). As noted, a number of methodologies that identify problematic areas of the model may be employed for the determination of the categorical areas to be handled by humans, as previously discussed. The conversations that are below the thresholds, and those falling within the determined categories, may be routed to a human operator (at 1493).

In this manner, a classification model may be automatically generated and continually refined. Such models are integral to the efficient operation of a conversational system, as discussed extensively, but may also have implications for the operation of more refined reward-based AI tools, as will be discussed below.

Figure 24A:
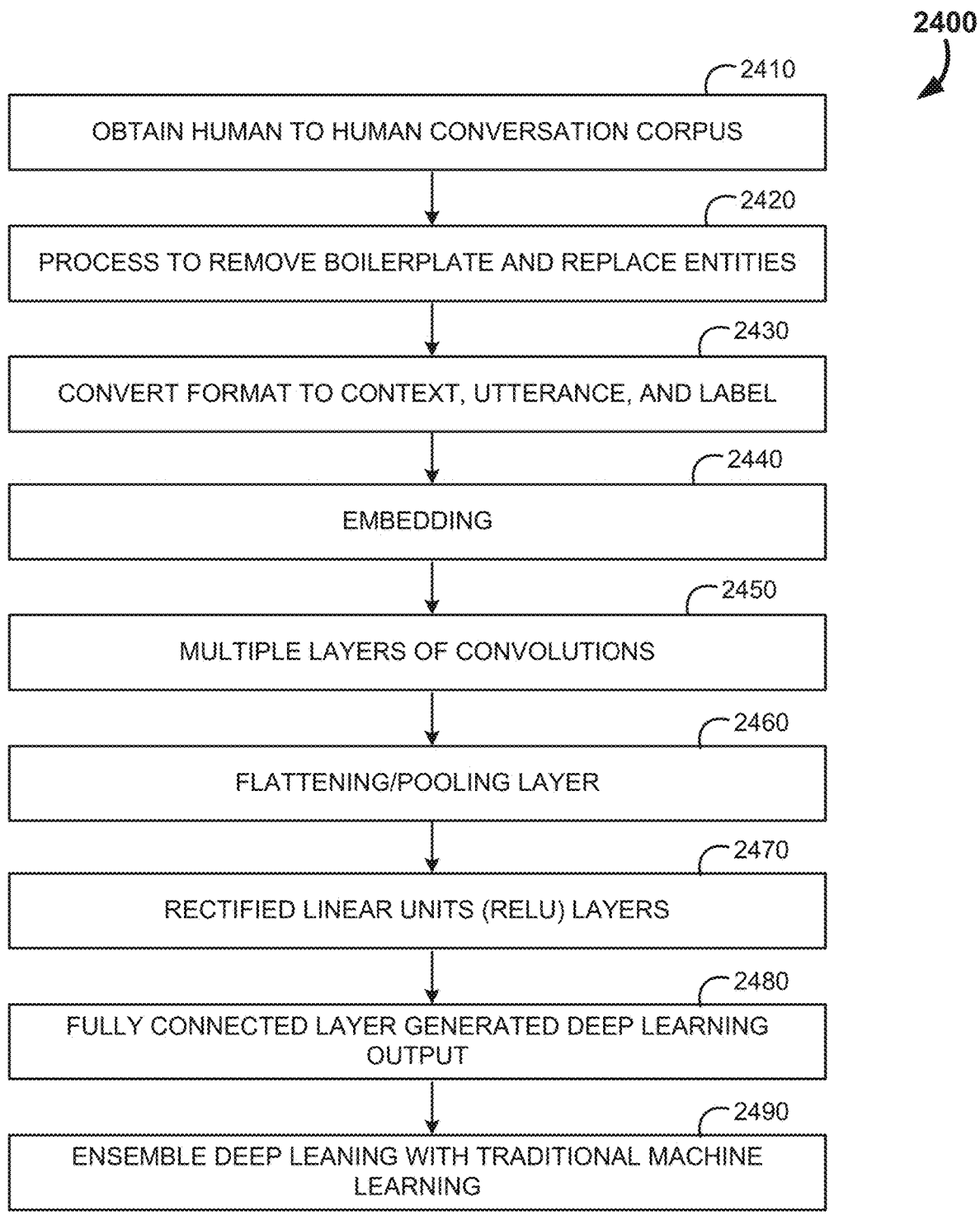
FIG. 24A is an example flow diagram for the process of generating deep learning hybrid models, in accordance with some embodiment.

Moving on, FIG. 24A is an example flow diagram for the process 2400 of generating deep learning hybrid models, in accordance with some embodiment. Deep learning models, as discussed previously, has implications for the feature extraction of the responses, particularly as it pertains to the development of the generation of constituency trees and name entity recognition. In this example process, a corpus of human-to-human conversations may be obtained (at 2410). These conversations may be processed to remove boilerplate and for entity replacement (at 2420). The format of the resulting conversations is then converted to context, utterance and labels (at 2430). In some embodiments deep learning may leverage convolutional neural networks (CNN) with Word2Vec and Glove embedding. In some particular embodiments, character level CNN may be particularly effective. Such systems include an embedding layer (at 2440), which may include InferSent Embeddings, followed by multiple layers of convolutions (at 2450) which consist of sets of learnable filters, each having a small receptive field, and passing forward to the subsequent convolution layer. Eventually the output is pooled (at 2460) which is a non-linear down sampling. Bidirectional Long Short Term Memory (LSTM) encoders with Max Pooling may be employed in some embodiments. The fully connected layer (Max Pooling) produces the deep learning output (at 2480) which may be combined with traditional machine learning to generate an ensemble model (at 2490). For example, to combine Char CNN, stacking may be used to learn a meta classifier based on probability values of individual actions by the component models. Algorithms that are chosen previously are diversified in nature and work well on different segments of our data-set so that the meta classifier will benefit from the respective strengths of each individual classifier. The ensemble framework provides flexibility in terms of adding or removing models as they are loosely coupled with the meta classifier. The ensemble of deep learning with traditional machine learning may be utilized for action classification and entity extraction, and may produce superior results as compared to merely using traditional machine learning techniques.

For example, FIG. 24B provides a chart 2400B of accuracy measures of different conversations using state of the art production models, agreement accuracy and deep learning accuracy. Note that while deep learning is not always the most accurate model, it often outperforms other models, and outperform the production model the majority of the time.

Figure 25A:
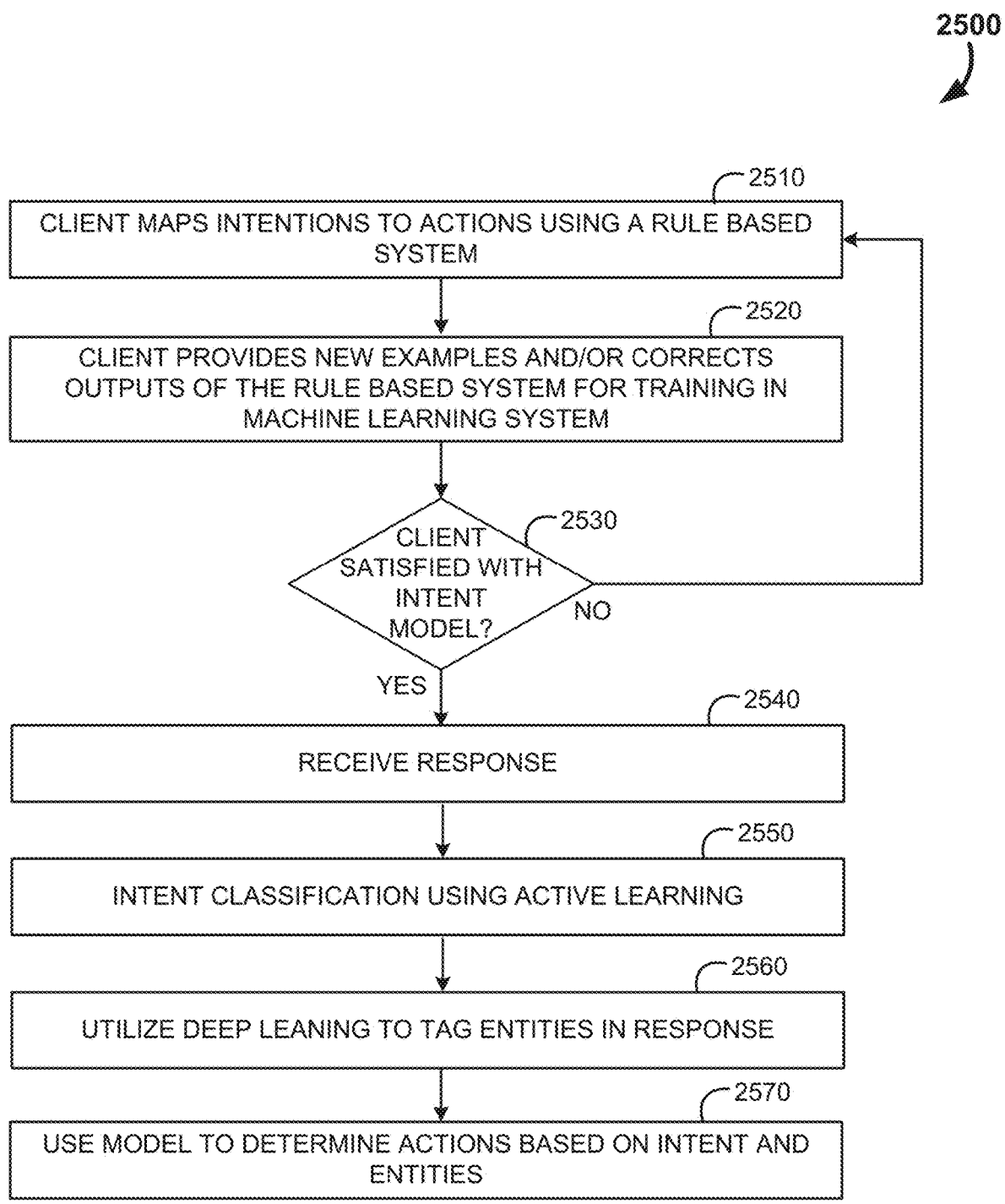
FIG. 25A is an example flow diagram for the process of intent based action response using a deep learning model, in accordance with some embodiment.

Moving on, FIG. 25A is a flow diagram for the example process 2500 of intent based action response using the deep learning model ensemble, in accordance with some embodiment. In traditional modeling, a response is mapped directly to an action. In intent based approach, the response is mapped to entities and intents, which are structured computer interpretable representations of what the response actually means. The intent and entity information is then used to determine the actions, which over time has been shown to be more accurate than direct response to action modeling.

In this process the client maps intentions to actions using a rule based system (at 2510). The client also provides new examples and/or corrections to outputs of the rule based system for training in the machine learning system (at 2520). The client monitors the intent model and continually provides mapping of actions to intent until satisfied (at 2530). Once the client is satisfied with the model's performance a response is received by the system (at 2540), and the intent classification is performed using active learning and/or the automated model building discussed previously (at 2550). Deep learning is then used to tag entities in the response (at 2560) and the model is utilized to determine actions based on the intent and entities (at 2570).

Figure 25B:
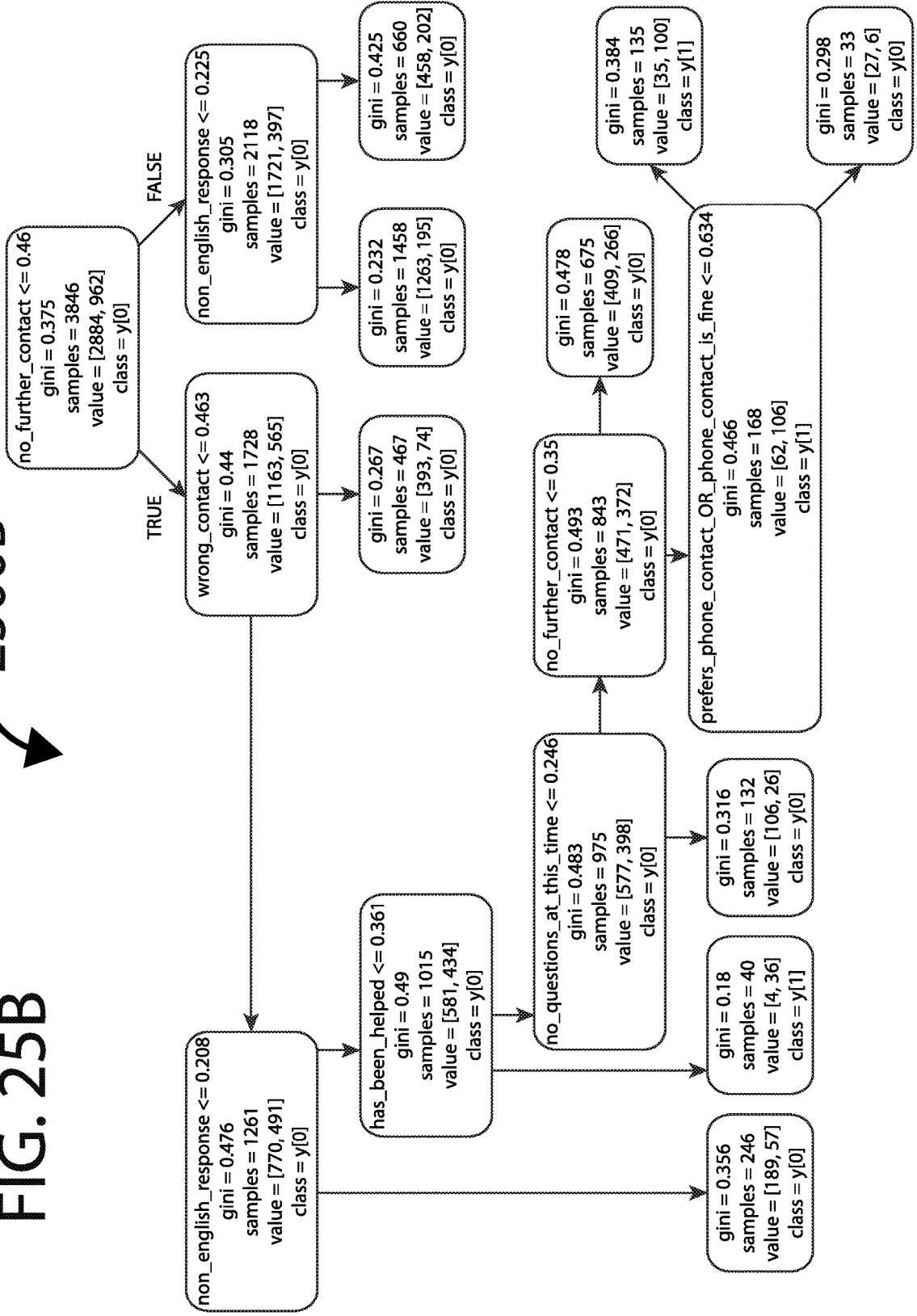
FIG. 25B is an example decision tree for intent based action for continuing messaging, in accordance with some embodiment.
Figure 25C:
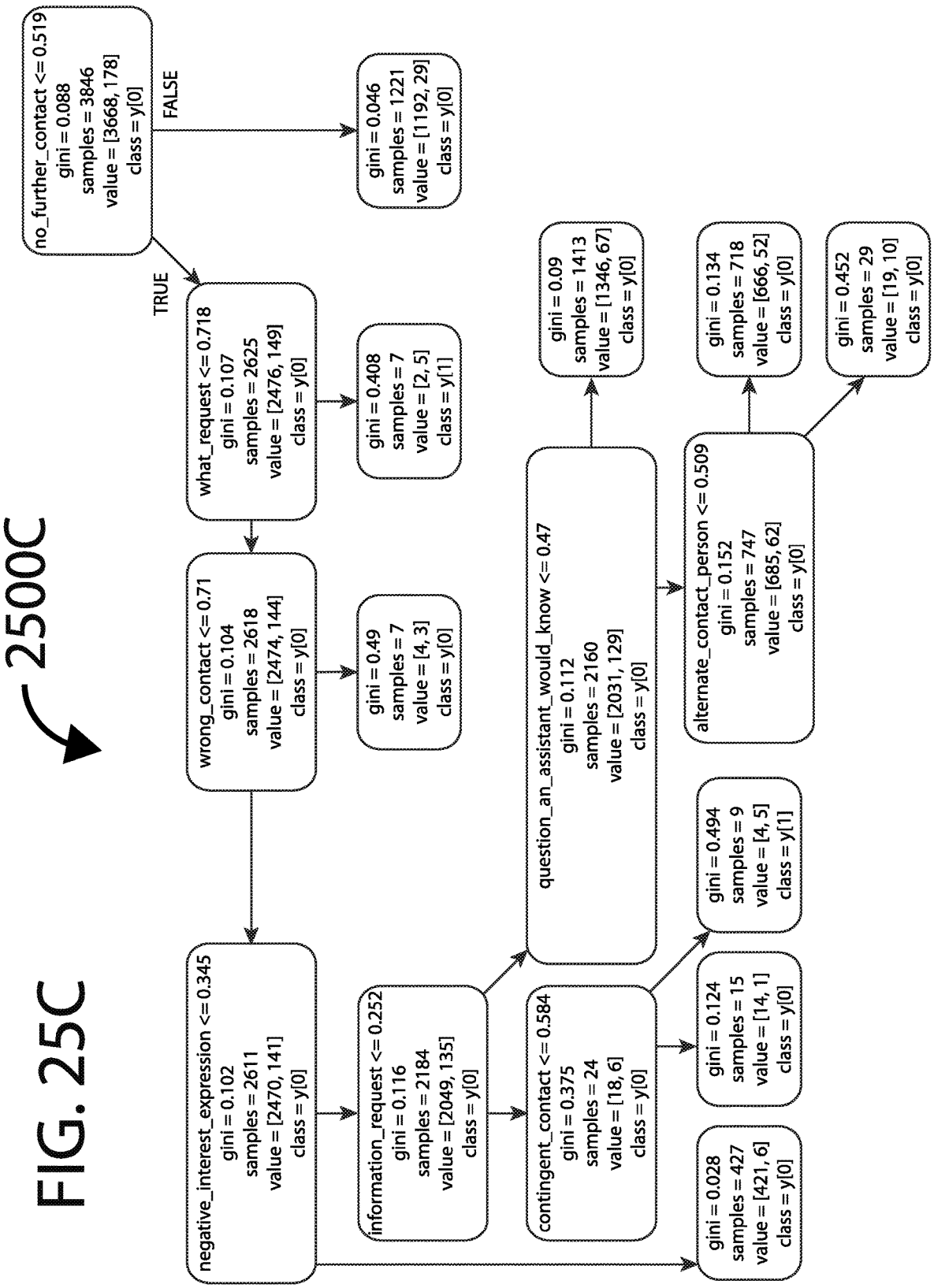
FIG. 25C is an example decision tree for intent based action for taking an additional action, in accordance with some embodiment.

FIGS. 25B and 25C provide examples of decision trees 2500B and 2500C, respectively, for such intent based decision processes. The first decision tree 2500B is for determining whether to continue contacting an individual, whereas the second decision tree 2500C is for generating an action response.

Figure 25D:
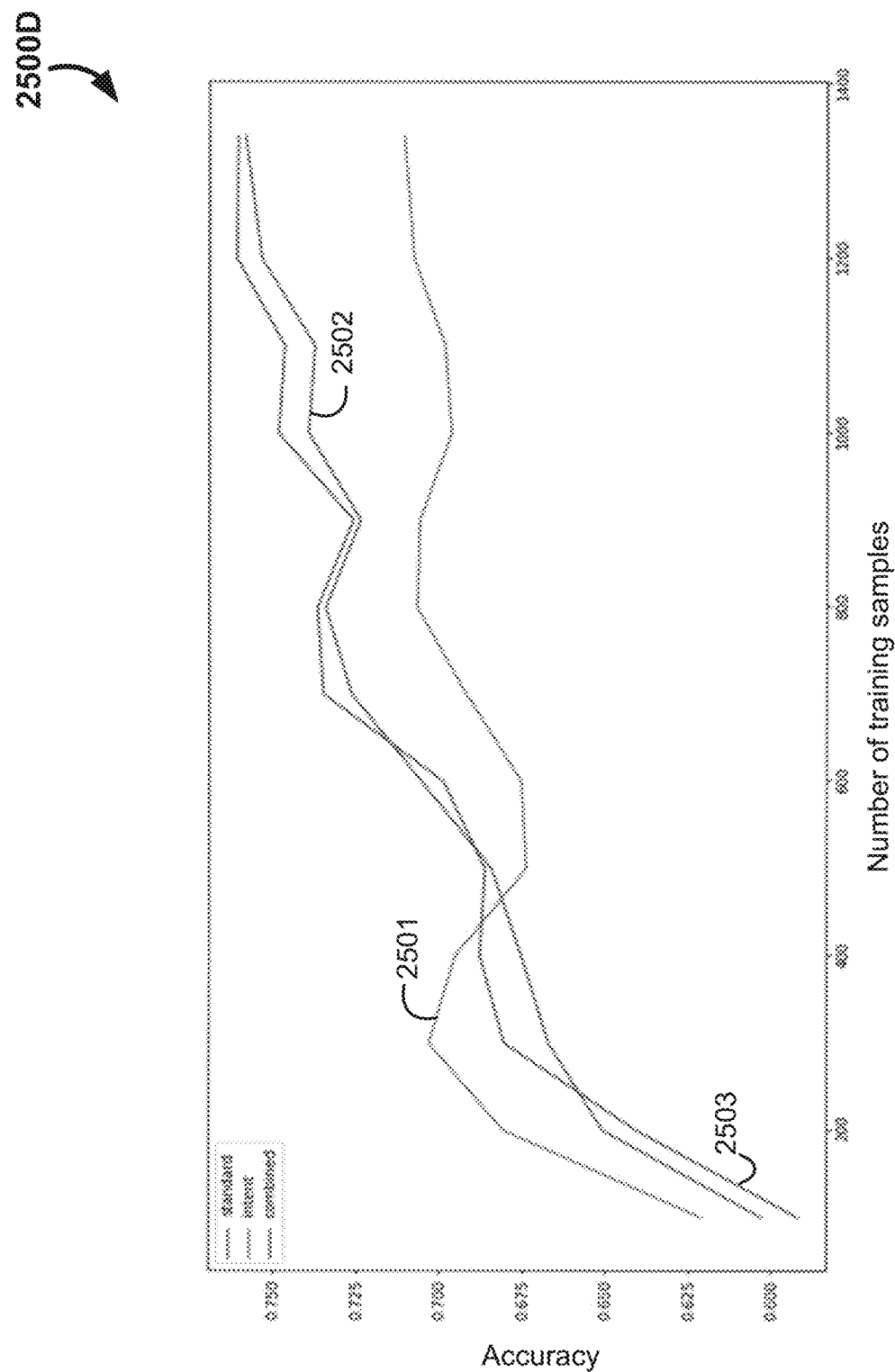
FIG. 25D is an illustration of an example accuracy chart for intent based action versus standard action processes, in accordance with some embodiment.

FIG. 25D provides a chart 2500D that illustrates the comparative accuracy of a standard machine learning based action response model, versus intent based response modeling and a combined model. Intent alone is shown at 2501, and performs very well at the outset when there are very few training samples. As the training size increases, the combined system 2503 and standard machine learned system (2502)'s accuracies improve dramatically and rapidly outpace intent alone modeling. In the long run, with sufficient training, the combined system proves to be the best and most accurate modeling system. This information may be leveraged when making decisions and the size of the training sample is known, such that the model utilized can depend accordingly.

Figure 26:
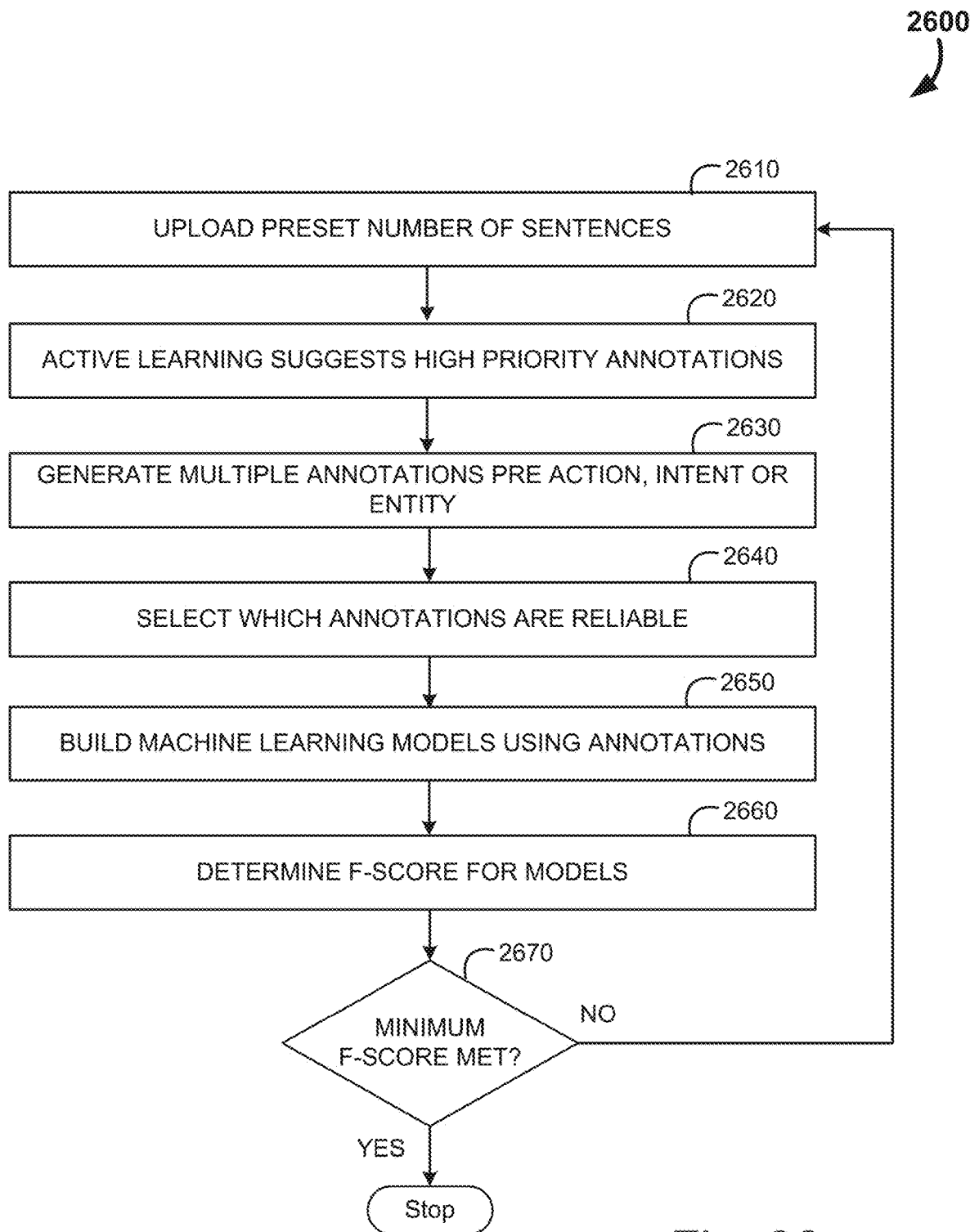
FIG. 26 is an example flow diagram for the process of model training leveraging active learning, in accordance with some embodiment.

FIG. 26 is an example flow diagram for the process 2600 of model training leveraging active learning, as used in the intent based approach for intent classification. Active learning, as used in this application is the process whereby a preset number of sentences is initially uploaded (at 2610) and is used to suggest high priority annotations within the uploaded sentences (at 2620). As described previously, sequential approaches such as Active Thompson Sampling (ATS) and Exponentiated gradient (EG) may be used to determine annotations that are high priority. ATS samples inputs after assigning a sampling distribution the data pool whereas EG applies optimal random exploration. In some embodiments, the preset number of sentences to be reviewed is set to one million, but any suitably large number of sentences may be utilized. Larger sentence numbers have the effect of requiring added computational requirements, but may result in greater model accuracy. Multiple annotations are then generated per action, intent or entity (at 2630). The next step is to select which annotations are reliable by recalibrating tasks with low inter-annotator agreement (at 2640). Machine learning models are built using the reliable annotations (at 2650). In some embodiments, approaches such as Map-Reduce, Hadoop and Spark may be employed when building these models. After models are constructed the F-score is calculated (at 2660) and compared with a minimum threshold (at 2670). In some use cases, the minimum acceptable F-score may be set to 95%. If the minimum F-score is reached then the model may be determined to be acceptable, and the process may end. However if this threshold is not yet met the process may be repeated with the uploading of an entirely new set of sentences for annotation and training of the model.

Figure 27A:
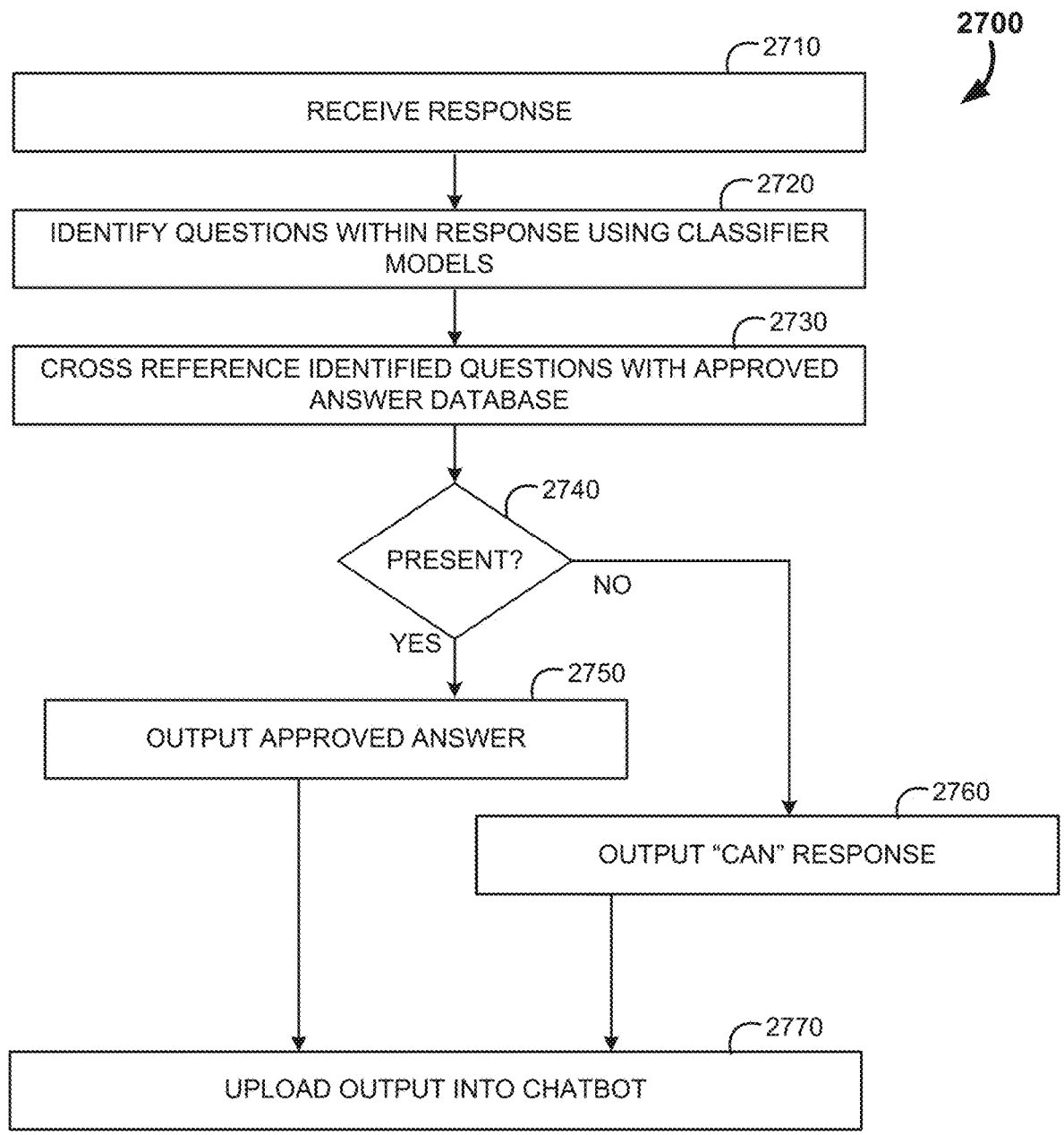
FIG. 27A is an example flow diagram for the process of responding to frequent questions using approved answers, in accordance with some embodiment.
Figure 27B:
FIG. 27B is an example illustration of a screenshot of a conversation between a human and an AI system employing frequent questions using approved answers, in accordance with some embodiment.

Moving on, FIG. 27A is an example flow diagram for the process 2700 of responding to frequent questions using approved answers by leveraging the automatically generated and updated classification models, in accordance with some embodiment. In this example process the classification models have already been generated using any of the already discussed methods. A response is received (at 2710) and through the classification it is determined that a question is present in the response (at 2720). Topics for the questions are determined by the classifier. The question topic is cross referenced against generic question topics for which approved answers have already been generated (at 2730). If an answer is present for the question (at 2740) the system may automatically output the answer or one of the semantically similar approved versions of the answer (at 2750), otherwise the system may output a canned response along the lines of "A representative will answer this question shortly" (at 2760). Regardless of output type, the output in this example system may be uploaded into a chat-bot for communication with the user (at 2770). An example of such a conversation with a chat-bot is provided in the example screenshot 2700B shown in relation to FIG. 27B.

Figure 28A:
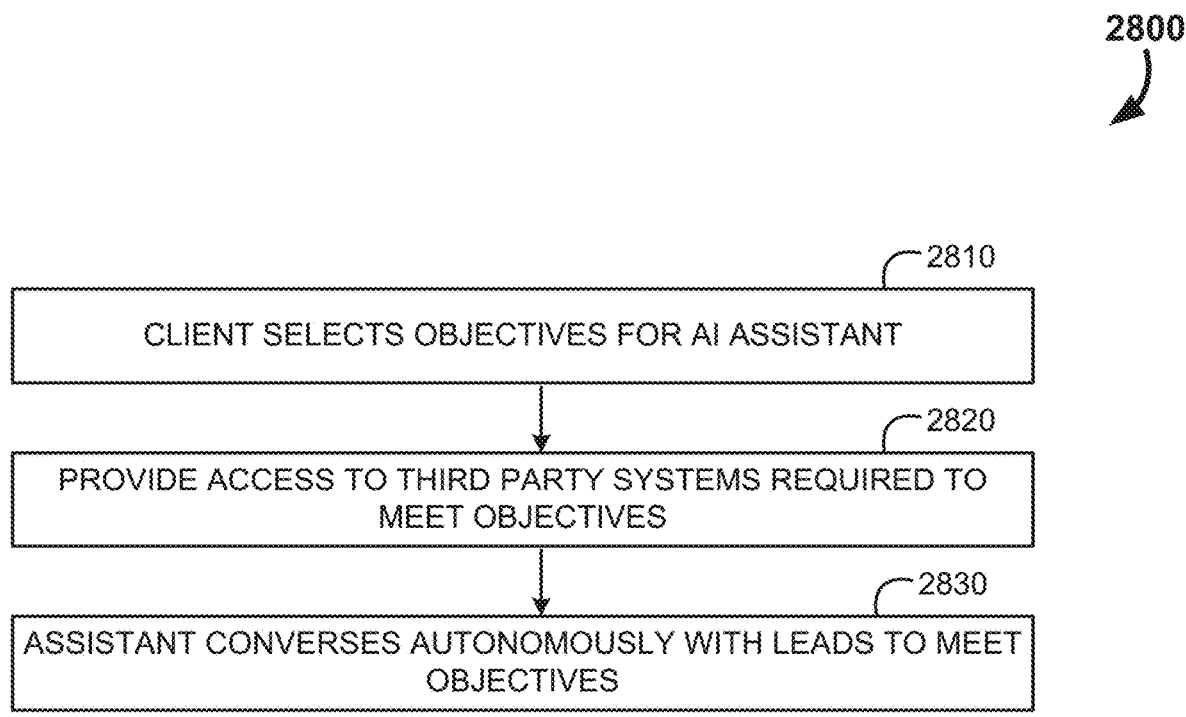
FIG. 28A is an example flow diagram for the process of utilizing objective based AI assistants, in accordance with some embodiment.

In addition to enabling the answering of frequently asked questions and general conversation dialog, the classification systems and methods disclosed herein may be adapted to perform reward-based conversational AIs for the purpose of fulfilling tasks as a "smart assistant". For example, FIG. 28A is an example flow diagram for the process 2800 of utilizing objective based AI assistants, in accordance with some embodiment. In this process a client user selects objectives for the AI assistant (at 2810) from a myriad of possible objectives. The AI system is required to have access to the client's third party systems related to completing these objectives (at 2820). For example, the AI assistant will typically require access to communication channel appropriate systems such as email systems, along with contact databases, calendar applications and other systems that contain data that's appropriate and helpful for the use cases being addressed by the conversational AI assistant. The assistant will automatically converse with leads to meet the objectives (at 2830) and take actions, when appropriate, to satisfy the objective conditions.

In some embodiments, objectives may include obtaining particular information about something (e.g., determine a customer's views, beliefs or opinions regarding a particular topic, etc.), classifying or scoring a lead into a category or metric, altering a target's opinion or perspective on a topic, or mere information dissemination. The AI assistants have the capacity to have a persistent memory of conversations, and may be enabled to have access to external data sources when coupled to appropriate third party systems. In some cases, the assistant may be enabled to have unlimited series within a given conversation until an objective is met, and may support multiple language models and multiple communication channel appropriate models and message templates.

Figure 28B:
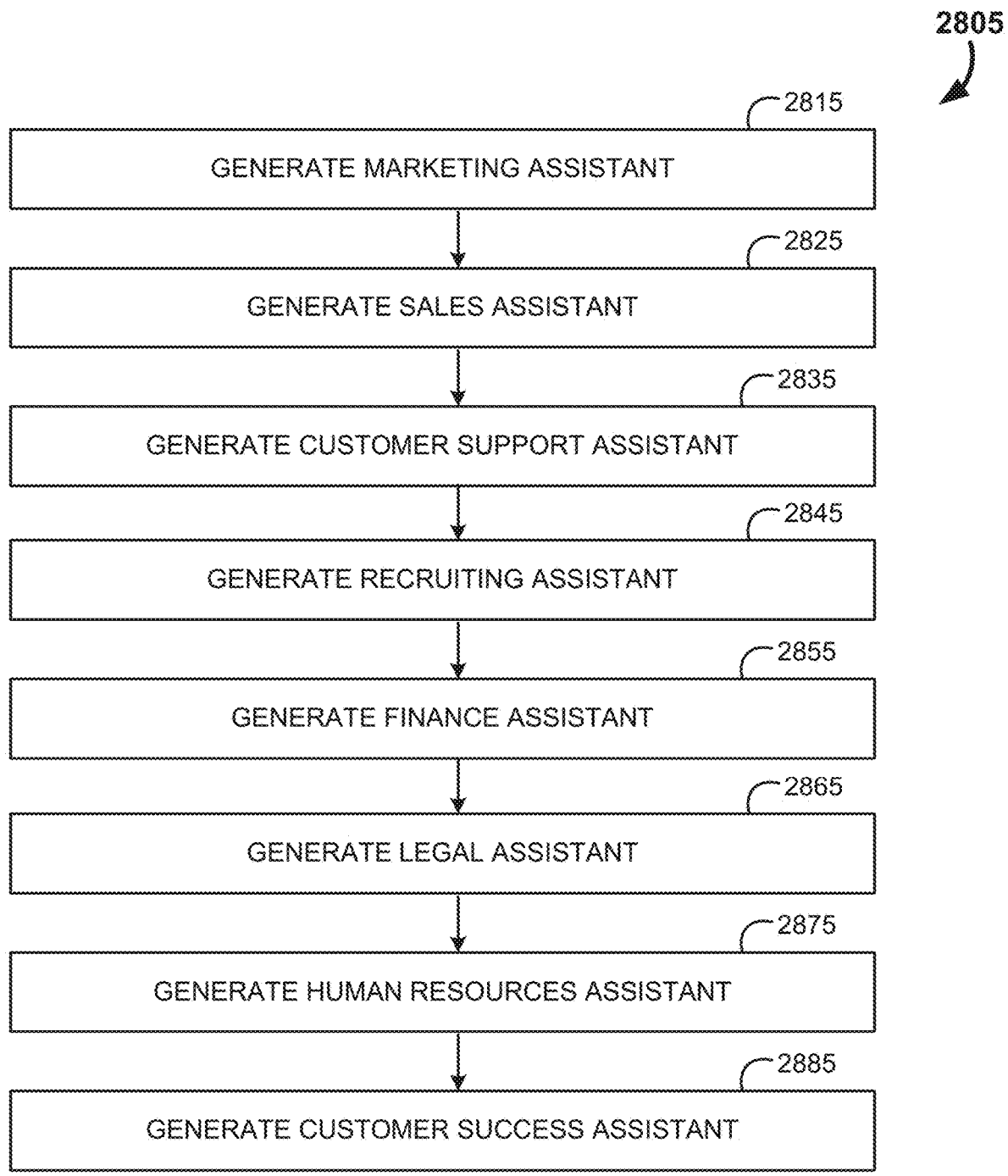
FIG. 28B is an example flow diagram for the process of generating objective based AI assistants, in accordance with some embodiment.

Given that objectives are configurable, the AI assistant may be designed for any task. However, within a business setting a few "prototypical" AI assistants emerge. FIG. 28B provides a flowchart for the process of generating these various assistants, shown generally at 2805. These include generating a marketing assistant 2815, a sales assistant 2825, a customer support assistant 2835, a recruiting assistant 2845, a finance assistant 2855, a legal assistant 2865, a human resources assistant 2875 and a customer success assistant 2885. Additional assistants could also include a social media management assistant and a pricing assistant and could be created to automate virtually any routine business conversation.

For example, FIG. 28C provides an example specification chart 2800C for a marketing assistant. This example marketing assistant may have a series of use cases tied to one or more of a set of objectives. The objectives for a marketing assistant would typically include setting up an appointment with sales, lead collection, and nurturing a relationship with a customer. The use cases may include following up with inbound leads, dealing with aged leads, pre-event management, post event management, outreach and determining alternative contacts, in this example.

In contrast, FIG. 28D provides an example specification chart 2800D for a customer success assistant. This example assistant for a customer success department may have objectives tied to adoption of new product features, scheduling a call with a customer success manager, contract renewal, feedback gathering, etc. Use cases for such an assistant could include upselling or expanding product or service usage, contract renewal, winning back lost customers, advocacy management, customer engagement to determine performance optics, and event management, for example.

Figure 28F:
FIG. 28F is an illustration of example specifications for a recruiting assistant, in accordance with some embodiment.

Further, these use cases and objectives may differ from that of a recruiter assistant which may be concerned with scheduling a call with a hiring manager as the only objective, and the use cases being candidate sourcing, applicant follow-up, and past applicant pool interest, as illustrated on the specification chart 2800F associated with FIG. 28F. A finance assistant on the other hand may have objectives to schedule a call with accounts receivable, acquire direct payment, and updating payment details. These may map directly to use cases of collections, payment reminders and updating billing information, as illustrated on the specification chart 2800E associated with FIG. 28E.

Regardless of specific objectives and use cases of the assistant, the novel classification models and dynamically generated messages and message templates leveraged by these AIs allows for a more organic conversation—the messaging feels and is personal, not like a newsletter. The conversations generated by the assistants enable very specific and relevant personalization of the conversations, which in turn promotes greater engagement by the other party.

One result of such a natural and organic conversation between a target and a given AI assistant is that the target will often become comfortable with interacting with the AI assistant, and may ask questions of the assistant that are outside of the expertise of the AI assistant. This is basic human nature: once the target has the contact information for the AI assistant who has been helpful in the past, and has thus built a relationship with a particular AI assistant, the target individual is likely to reengage the same AI if he has additional questions or concerns. As detailed above, the disclosed AI assistants are highly capable of communicating with a target within a given use case for a specific objective. However as the topics being conversed about deviate from these well-understood topics, the AI assistant may be the incorrect vehicle to continue the conversation with the target. In these situations, the AI assistants may employ message routing capabilities to ensure the human target of the conversation receives the correct answers and the best user experience possible.

Figure 29:
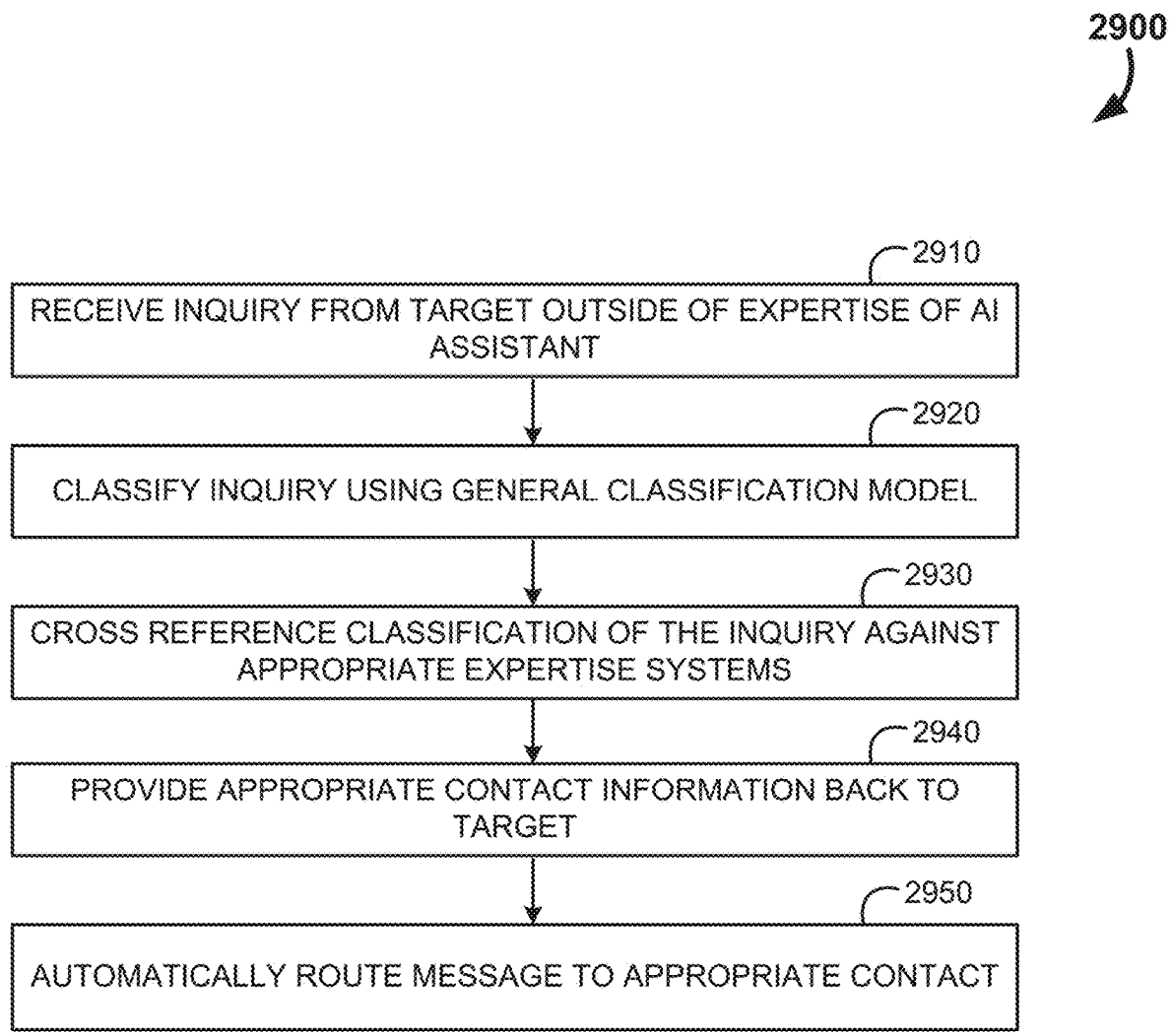
FIG. 29 is an example flow diagram for the process of message routing, in accordance with some embodiment.

FIG. 29 provides an example flow diagram for a method for message routing, shown generally at 2900. In this process, the human target provides a message to the AI assistant (at 2910) which when analyzed using the AI assistants classification models is not found to include a topic or classification that the AI assistant is capable of handling in an optimal manner. Upon determination that the message from the human target is not a topic for which the AI assistant is suited to respond to, a separate generic classification model may be employed to classify the message topic (at 2920). The result of this generic classification of the message may be cross referenced against an internal listing of expertise systems and/or individuals (at 2930). This listing of experts, the contact information associated with these experts, and the rules associating a classification to a given expert, may be maintained by a customer that is employing the AI assistant system.

Once the cross referencing identifies an appropriate expert for the message, the system may provide this contact information back to the target (at 2940), automatically forward the message to this expert (at 2950) or do both. In this manner, the human target is given the contact information of the system (such as another AI assistant), or individual (such as a sales representative), that is best able to address the needs of the target individual.

Figure 30:
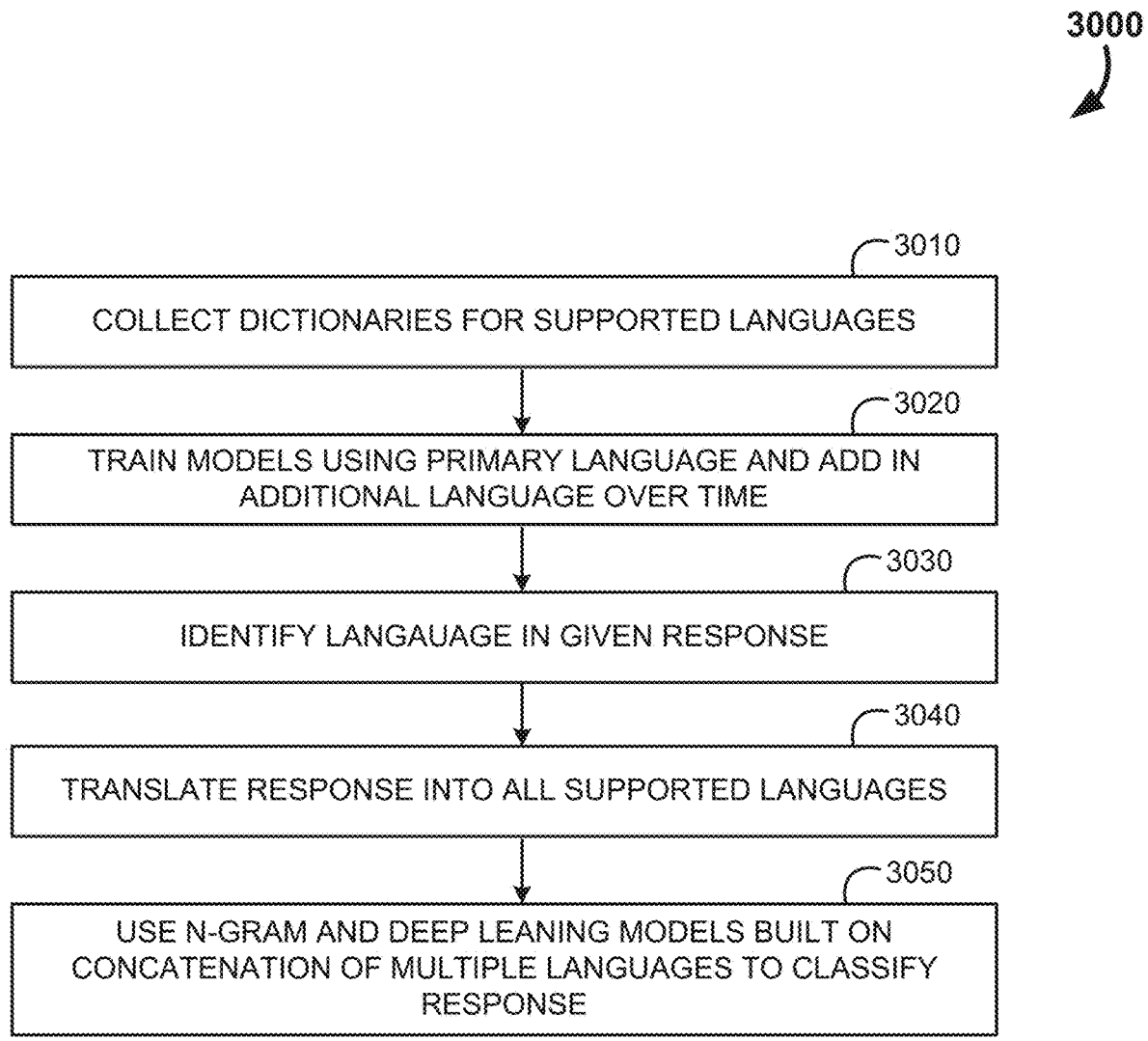
FIG. 30 is an example flow diagram for the process of modeling using multiple languages, in accordance with some embodiment.

Lastly, FIG. 30 provides an example flowchart for the process of handling multiple languages in an improved manner over traditional methodologies, shown generally at 3000. In this process dictionaries are collected for the supported languages (at 3010). The classification models may be trained using a central language and training datasets in alternate languages may be incorporated slowly over time (at 3020) to enable multi-lingual classifications. For any given response, the language employed is initially determined (at 3030). The response is then translated into all available languages (at 3040) to allow for human operator audit and review. Classification may be performed on all response translations (at 3050), and confidence measures for each may be determined. If confidence is reasonably high in the native language, this classification may be utilized; however, if the native language classification is significantly lower than one of the translations, the classification with the highest confidence may alternatively be used, regardless of language employed. In alternate embodiments, n-gram and deep learning models may be employed on a concatenation of the multiple languages for the classification of the response.

In addition to being capable of analyzing responses in multiple supported languages, the present systems and methods are capable of storing information regarding the language preferred by the contact, and may ensure that future communications with this contact are generated in this preferred language.

III. System Embodiments

Figure 31A:
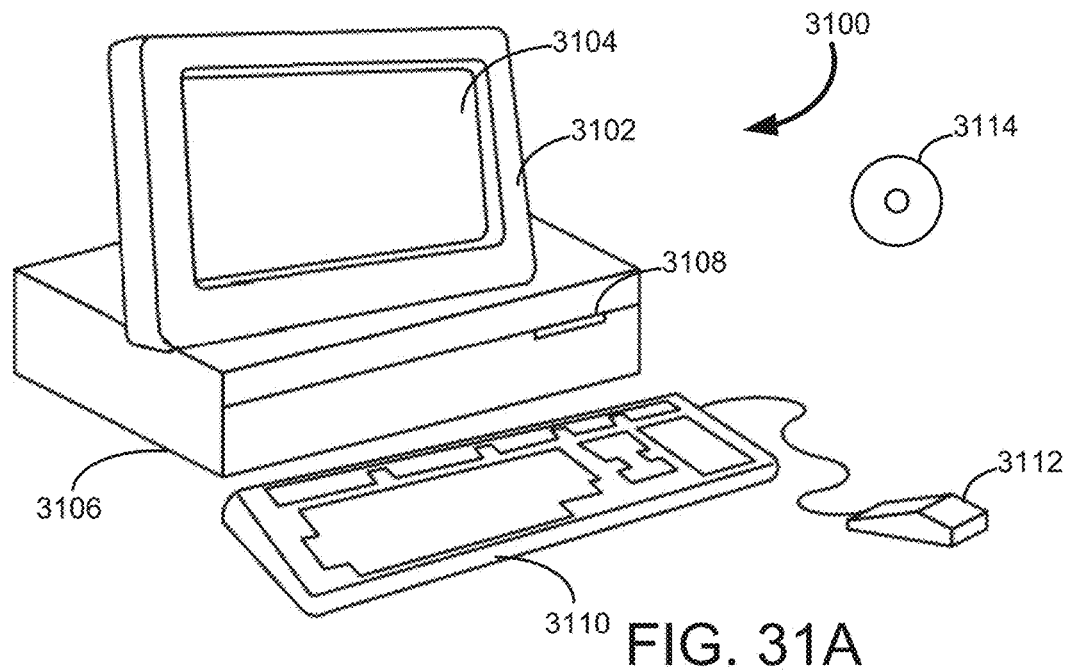
FIGS. 31A and 31B are example illustrations of a computer system capable of embodying the current invention.
Figure 31B:
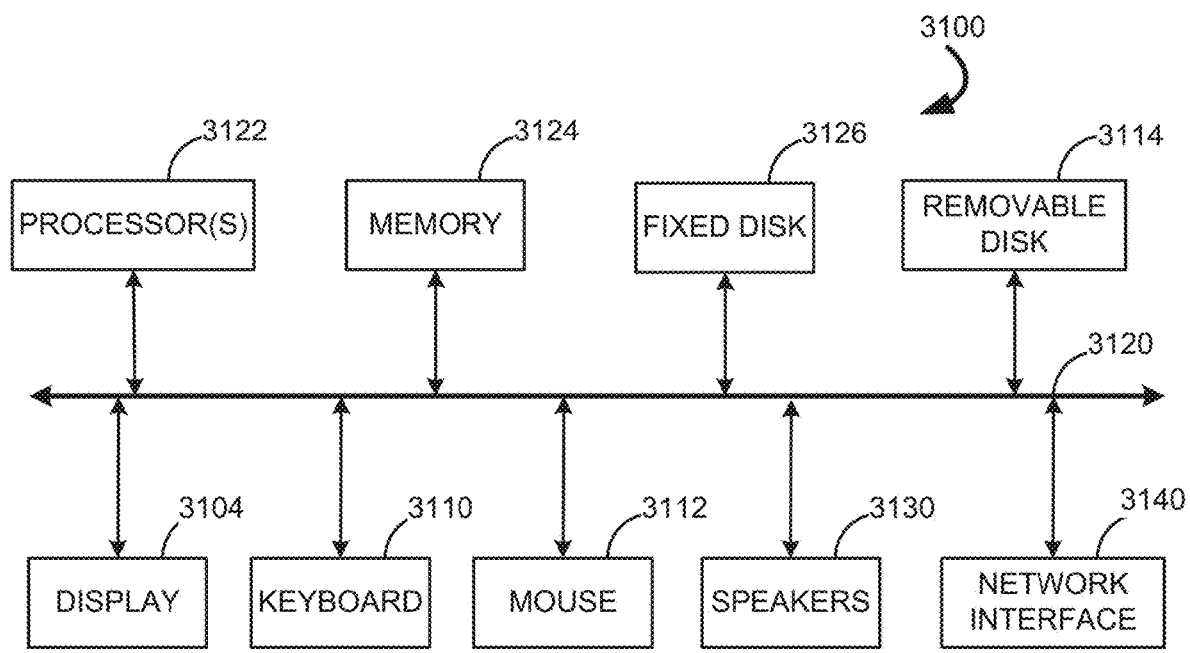

Now that the systems and methods for the conversation generation, message classification, response to messages, and the various forms of improved model creation and updating have been described, attention shall now be focused upon systems capable of executing the above functions. To facilitate this discussion, FIGS. 31A and 31B illustrate a Computer System 3100, which is suitable for implementing embodiments of the present invention. FIG. 31A shows one possible physical form of the Computer System 3100. Of course, the Computer System 3100 may have many physical forms ranging from a printed circuit board, an integrated circuit, and a small handheld device up to a huge super computer. Computer system 3100 may include a Monitor 3102, a Display 3104, a Housing 3106, a Disk Drive 3108, a Keyboard 3110, and a Mouse 3112. Disk 3114 is a computer-readable medium used to transfer data to and from Computer System 3100.

FIG. 31B is an example of a block diagram for Computer System 3100. Attached to System Bus 3120 are a wide variety of subsystems. Processor(s) 3122 (also referred to as central processing units, or CPUs) are coupled to storage devices, including Memory 3124. Memory 3124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 3126 may also be coupled bi-directionally to the Processor 3122; it provides additional data storage capacity and may also include any of the computer-readable media described below. Fixed Disk 3126 may be used to store programs, data, and the like and is typically a secondary storage medium (such as a hard disk) that is slower than primary storage. It will be appreciated that the information retained within Fixed Disk 3126 may, in appropriate cases, be incorporated in standard fashion as virtual memory in Memory 3124. Removable Disk 3114 may take the form of any of the computer-readable media described below.

Processor 3122 is also coupled to a variety of input/output devices, such as Display 3104, Keyboard 3110, Mouse 3112 and Speakers 3130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 3122 optionally may be coupled to another computer or telecommunications network using Network Interface 3140. With such a Network Interface 3140, it is contemplated that the Processor 3122 might receive information from the network, or might output information to the network in the course of performing the above-described model learning and updating processes. Furthermore, method embodiments of the present invention may execute solely upon Processor 3122 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 3100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for training a model using active learning comprising:
    collecting a corpus of conversations from a database;
    applying one or more transformations to the corpus including entity replacement to create context, utterance and label sets, wherein the context, utterance and label sets are a first training set;
    training a neural network using the first training set;
    uploading a preset number of sentences;
    suggesting high priority annotations in the uploaded sentences;
    generating multiple annotations per action, intent, or entity found in the uploaded sentences;
    select from the multiple annotations a subset of reliable annotations, where the subset is selected based upon low inter-annotator agreement;
    creating a second training set comprising feature vectors defined using the subset of reliable annotations;
    training a machine learning model using the second training set; and
    generating an ensemble model by combining the trained neural network and the trained machine learning model using a loosely coupled metadata classifier, and wherein the ensemble model provides superior classification results compared to traditional machine learning techniques.

2. The method of claim 1, wherein the training the machine learning model employs Amazon Web Services Spark.

3. The method of claim 1, further comprising calculating F-score for the machine learning model.

4. The method of claim 3, further comprising comparing the F-score to a threshold.

5. The method of claim 4, wherein the threshold is 95%.

6. The method of claim 4, further comprising outputting the machine learning model for production when the F-score is above the threshold.

7. The method of claim 4, further comprising uploading a subsequent preset number of sentences and repeating annotation on said subsequent preset number of sentences to improve the machine learning F-score.

8. A computer implemented method for training a model using active learning comprising:
    collecting a corpus of conversations from a database;
    applying one or more transformations to the corpus including entity replacement to create context, utterance and label sets, wherein the context, utterance and label sets are a first training set;
    training a neural network using the first training set;
    uploading a preset number of sentences;
    suggesting high priority annotations in the uploaded sentences;
    generating multiple annotations per action, intent, or entity found in the uploaded sentences;
    select from the multiple annotations a subset of reliable annotations as a second training set, where the subset is selected based upon low inter-annotator agreement;
    training a machine learning model using the second training set, wherein the machine learning model includes an algorithm and a set of parameters; and
    optimizing the set of parameters in a distributed computing system; and
    generating an ensemble model by combining the trained neural network and the trained machine learning model using a loosely coupled metadata classifier, and wherein the ensemble model provides superior classification results compared to traditional machine learning techniques.

9. The method of claim 8, wherein the optimization uses cross-validated grid-search.

10. The method of claim 8, wherein the optimization uses randomized search cross validation.

11. The method of claim 8, wherein the optimization uses sequential nested search cross validation.

* * * * *